United States Patent

[11] 3,577,050

[72] Inventors William L. Ringland
    Greendale;
    Manfred E. Neumann, New Berlin; Ernst
    K. Kaeser, West Allis; Thomas P. Gilmore,
    Wauwatosa; Allois F. Geiersbach,
    Milwaukee, Wis.
[21] Appl. No. 853,462
[22] Filed Aug. 27, 1969
[45] Patented May 4, 1971
[73] Assignee Allis-Chalmers Manufacturing Company
    Milwaukee, Wis.

[54] VEHICLE DRIVEN BY SYNCHRONOUS MOTORS
    58 Claims, 34 Drawing Figs.
[52] U.S. Cl. .................................................. 318/146,
    318/148, 318/168, 318/171, 318/231
[51] Int. Cl. ....................................... H02p 5/22
[50] Field of Search .......................... 318/146-
    —148, 168—175, 231, 227; 290/14, 17

[56] References Cited
    UNITED STATES PATENTS

| | | | |
|---|---|---|---|
| 3,164,760 | 1/1965 | King .......................... | 318/231 |
| 3,402,333 | 9/1968 | Hayner et al. ................. | 318/171 |
| 3,443,184 | 5/1969 | Lemmrich ..................... | 318/231 |
| 2,370,078 | 2/1945 | Schaelchlin .................. | 318/231 |
| 3,320,506 | 5/1967 | Humphrey ..................... | 318/231 |
| 3,394,297 | 7/1968 | Risberg ....................... | 318/231 |
| 3,477,002 | 11/1969 | Campbell ..................... | 318/231 |
| 3,484,669 | 12/1969 | Roberts ....................... | 318/176 |

FOREIGN PATENTS

| | | | |
|---|---|---|---|
| 745,840 | 3/1956 | Great Britain ................ | 318/231 |

*Primary Examiner*—Oris L. Rader
*Assistant Examiner*—K. L. Crosson
*Attorneys*—Lee H. Kaiser, Robert B. Benson and Thomas F. Kirby ABSTRACT: The wheels of a vehicle are driven by inductor type synchronous motors having solid rotors without windings and commutators. A diesel on the vehicle drives a pair of high frequency rotating generators each of which supplies power to a pair of the synchronous motors. Power pedal means actuated by the operator derive a power signal proportional to the desired tractive effort for the vehicle. A separate electric drive for each motor includes means for deriving a control signal modulated at motor speed, a cycloconverter between each motor and its generator regulated by the control signal, tachometer means for deriving a speed signal which is a function of motor speed, and control means responsive to both the power signal and speed signal for regulating the magnitude and phase of the control signal so that the motor output power is constant over the speed range at a level in accordance with the power pedal setting.

Brake means actuated by the operator derive a brake signal, and the vehicle has means for shifting the phase of the control signals for all the motors to regeneratively brake them when the brake signal exceeds the power signal. The vehicle has travel direction selector means for shifting the phase of all the control signals to reverse the direction of motor rotation and thus propel the vehicle backward. The vehicle has manually operated means for setting a speed limit for the vehicle and means for deriving a speed limit signal which is additive to the brake signal to regeneratively brake the motors when vehicle speed exceeds the set speed limit. Turn compensation means increase the power supplied to the motors of the wheels on the outside of a turn and decrease the power supplied to the motors of the wheels on the inside of the turn as a function of the degree of turn and the magnitude of the power signal.

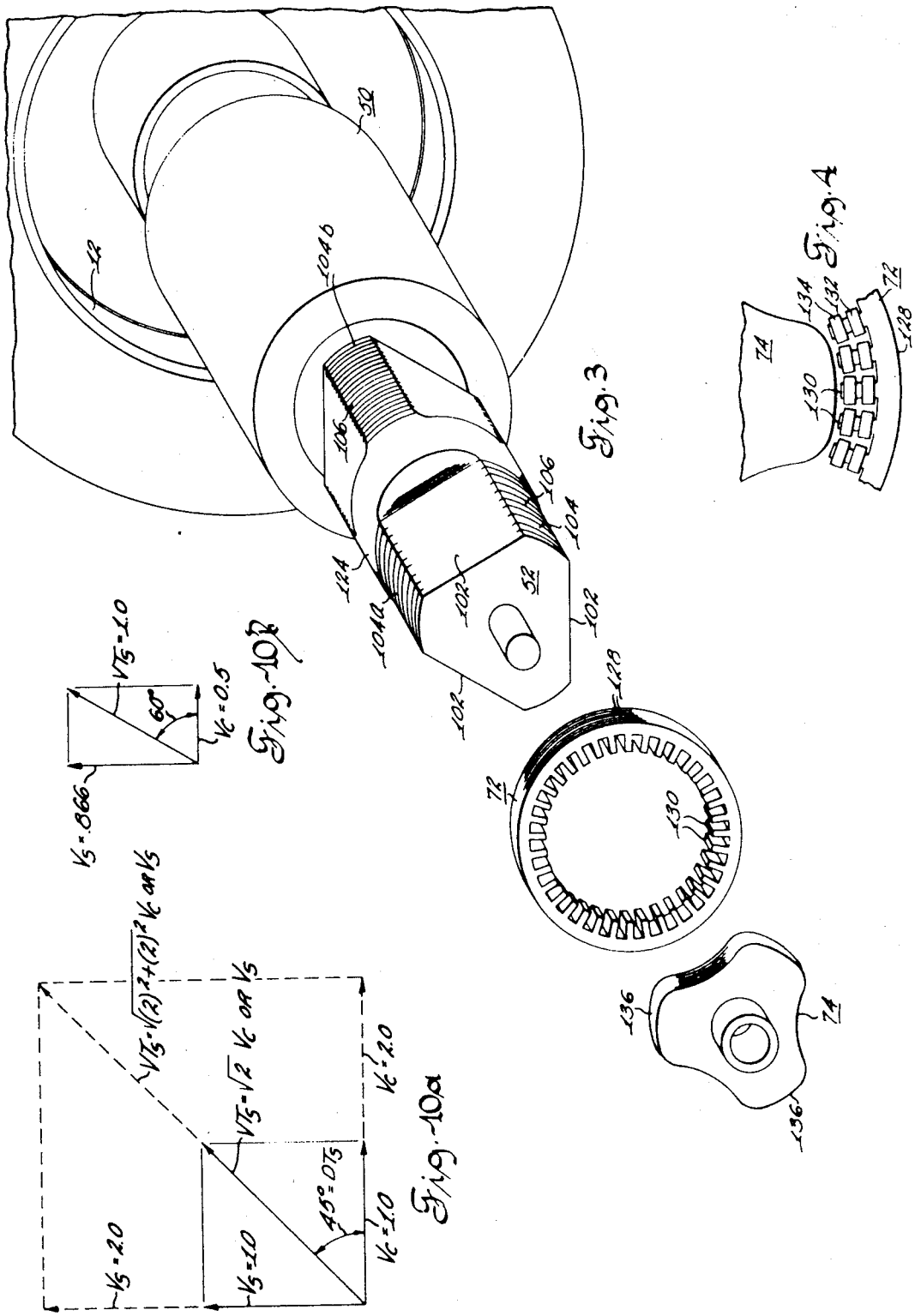

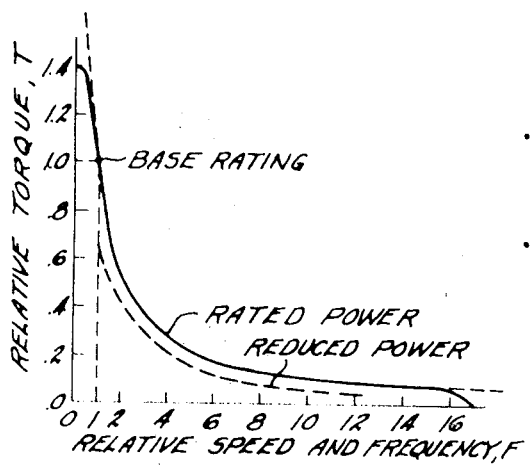
Fig. 5
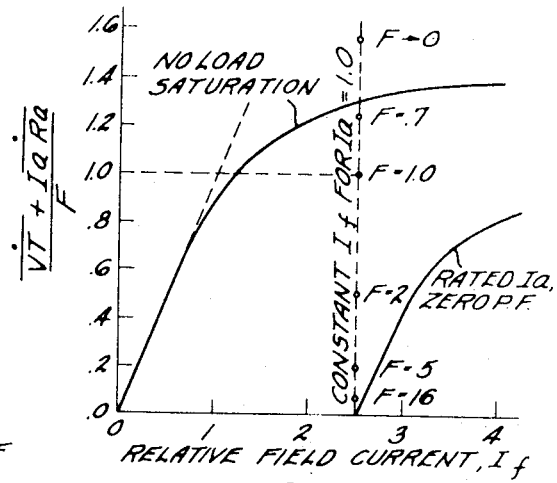
Fig. 6
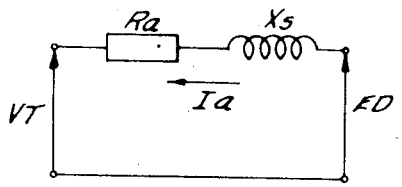
Fig. 7a
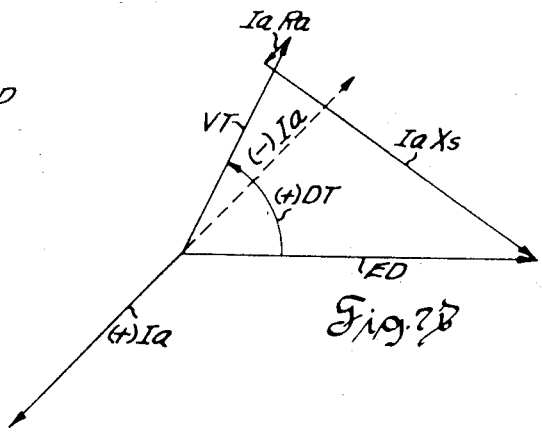
Fig. 7b
Fig. 7c
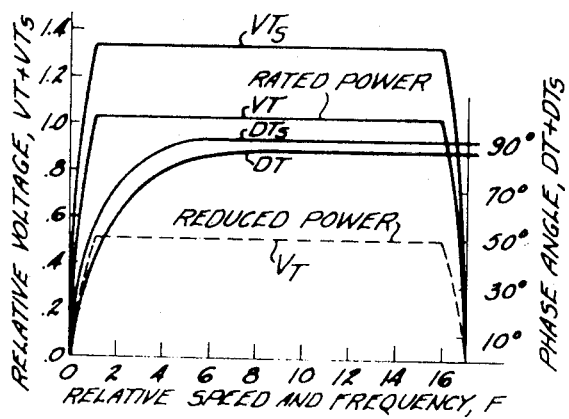
Fig. 8

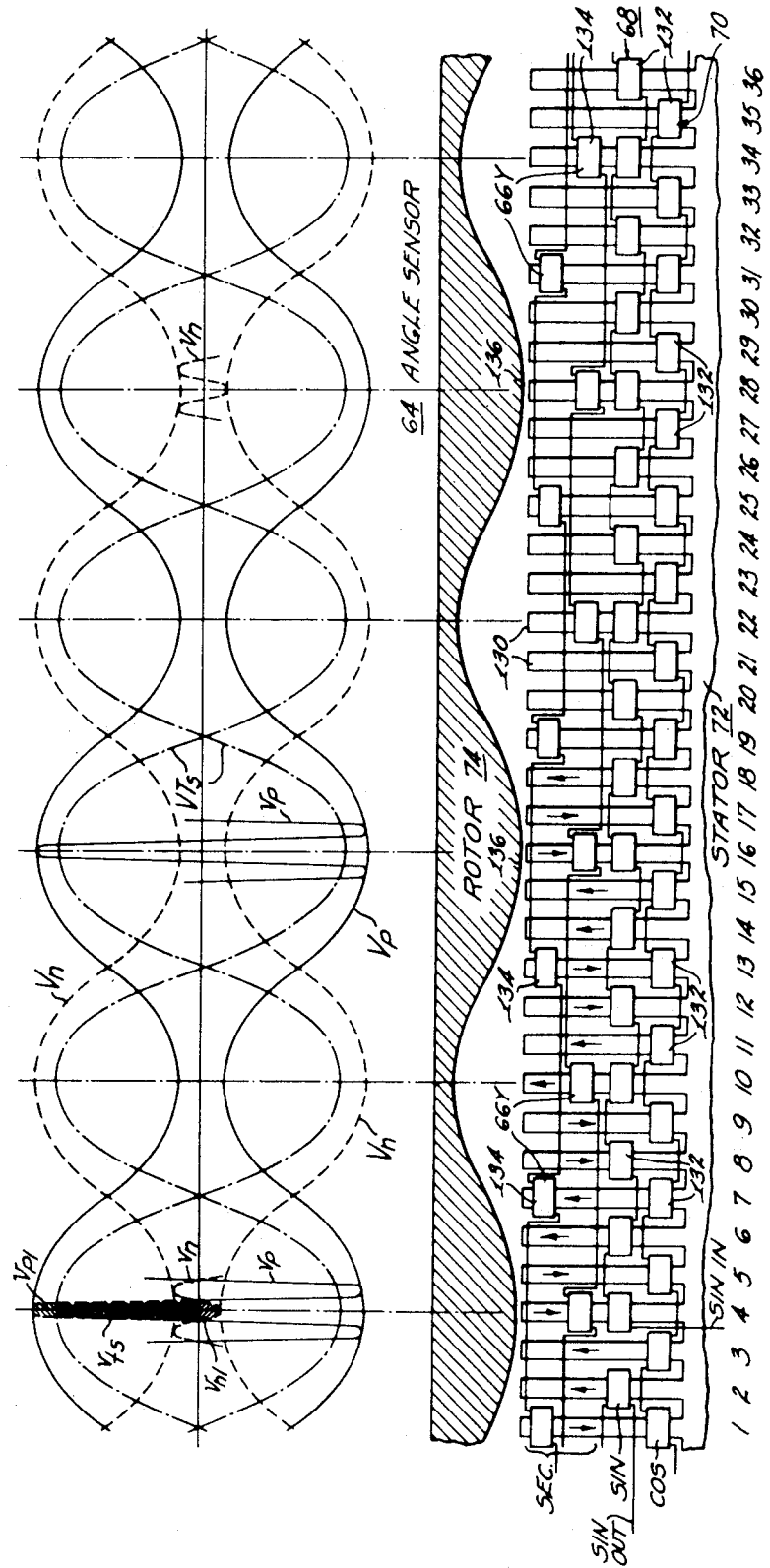

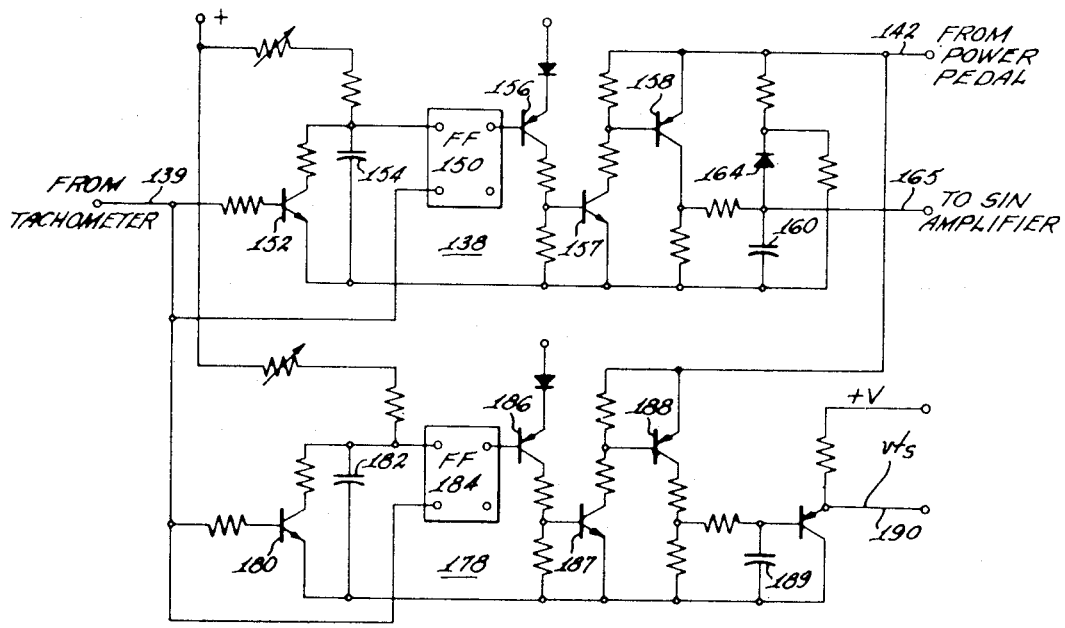
Fig. 13
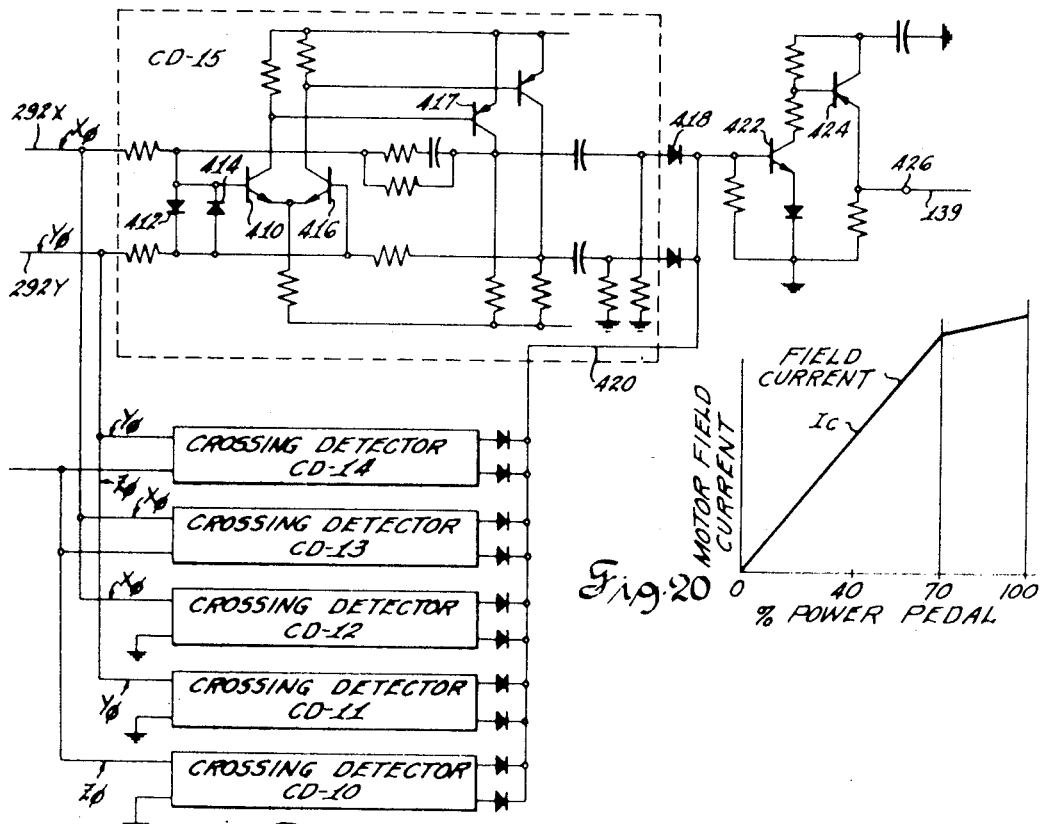
Fig. 16
Fig. 20

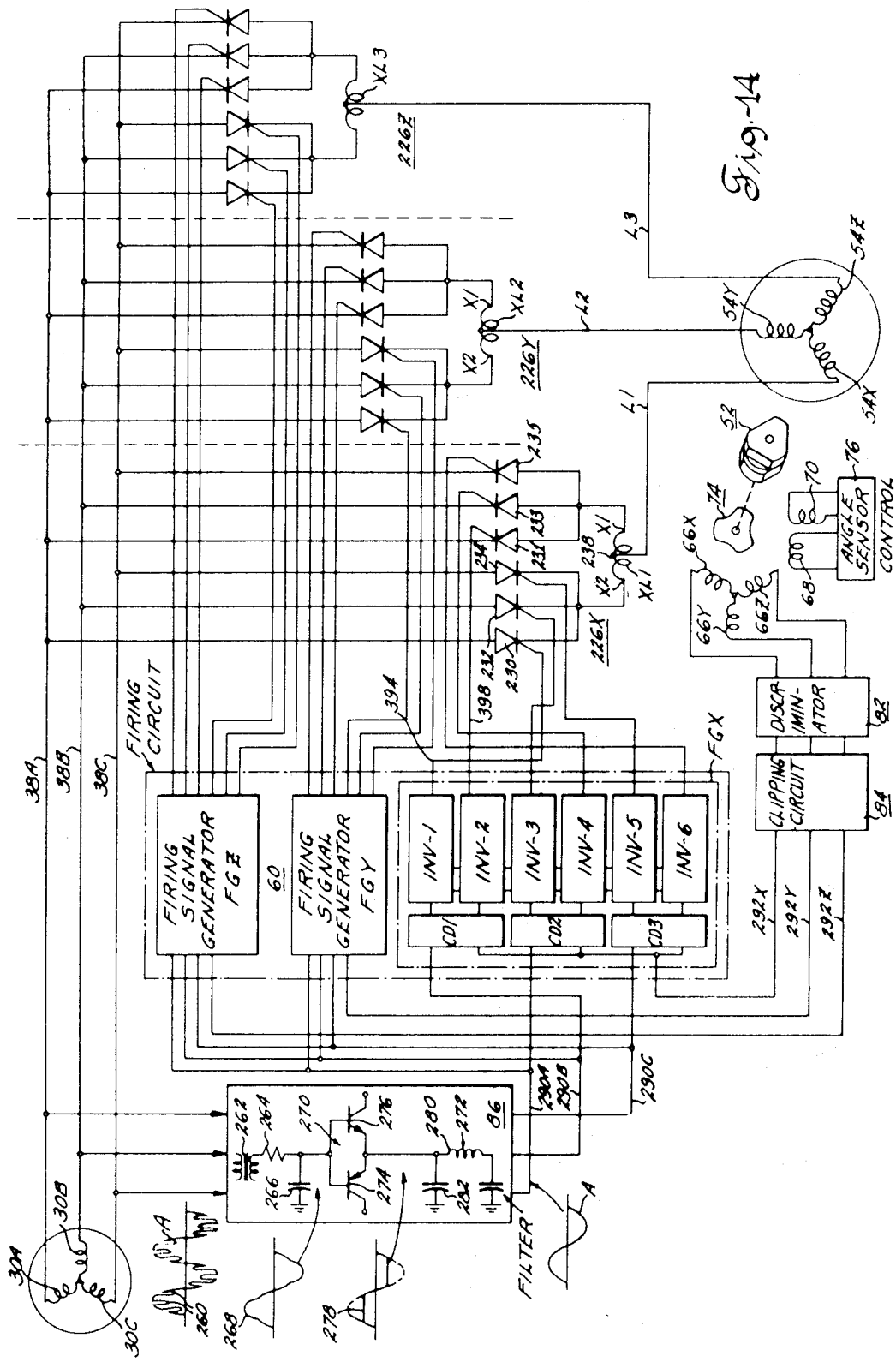

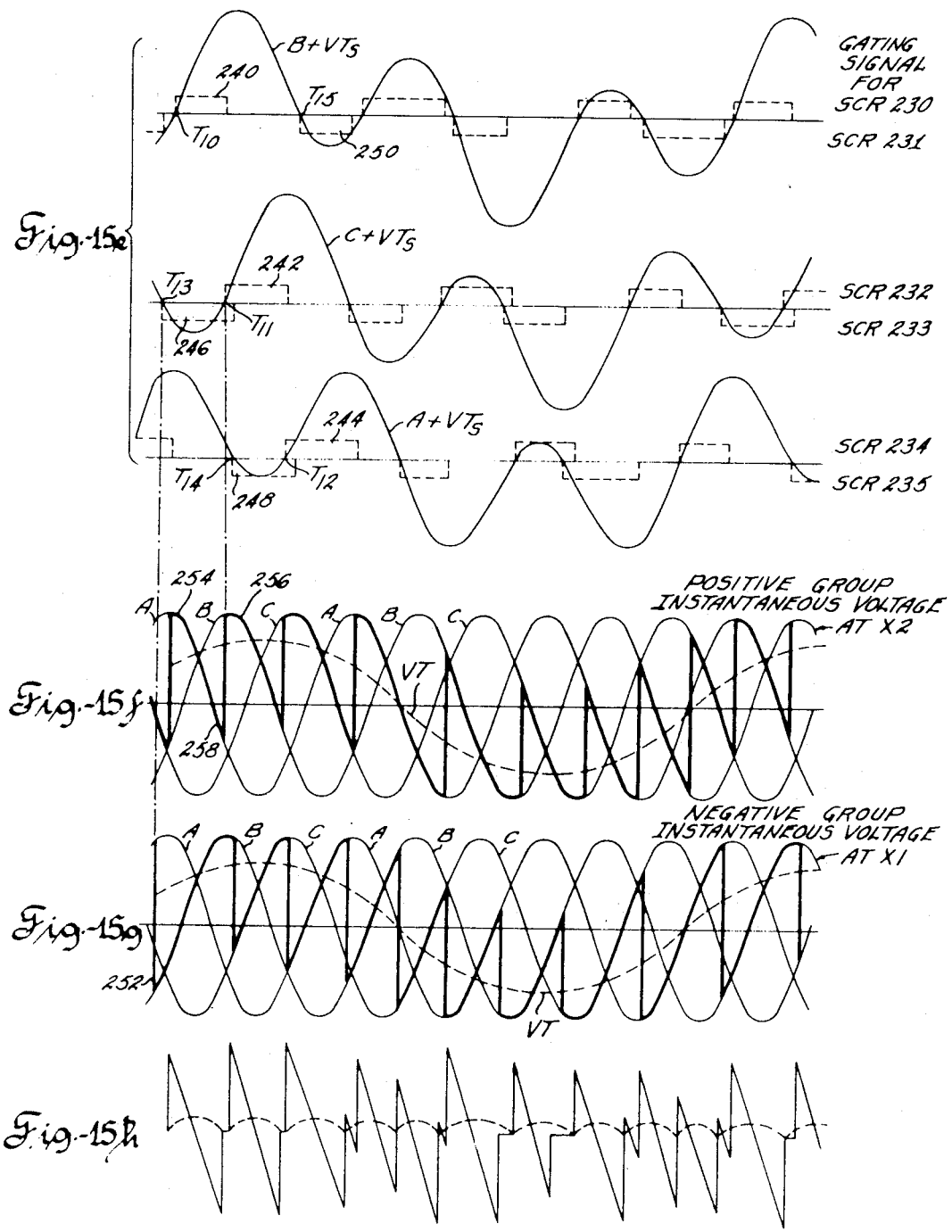

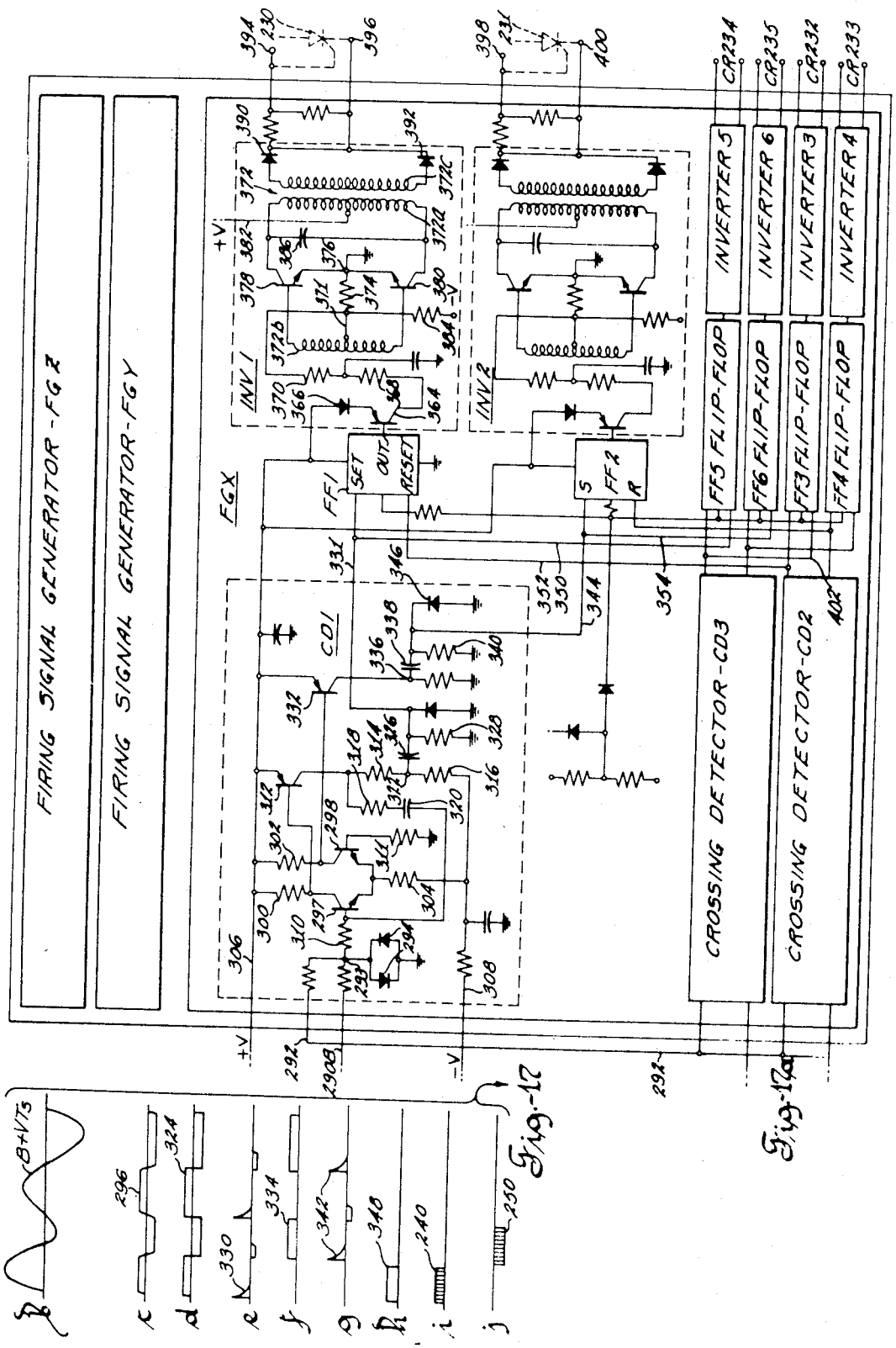

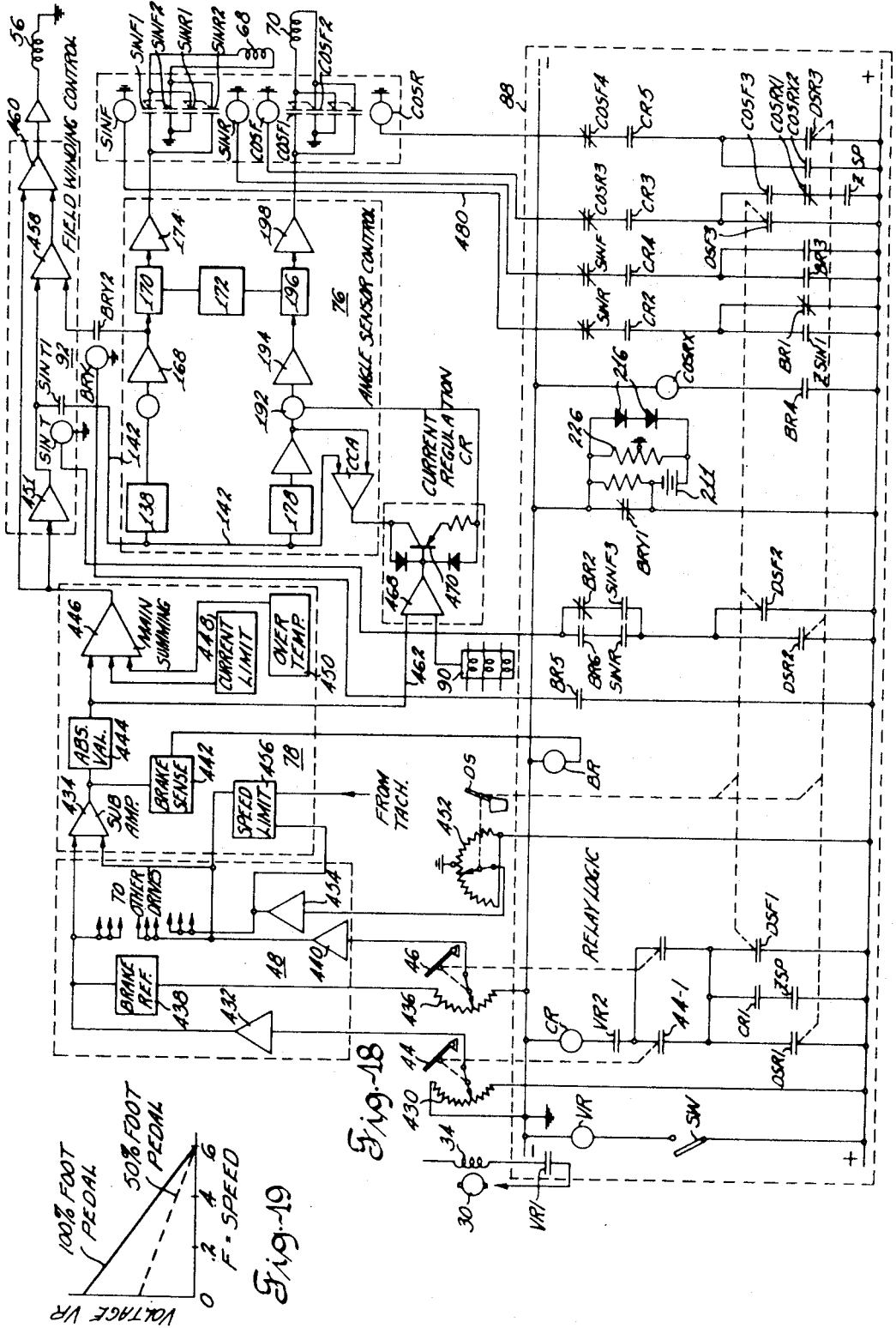

VEHICLE DRIVEN BY SYNCHRONOUS MOTORS

This invention relates to electrically driven vehicles and in particular to vehicles driven by synchronous electric motors.

This application is a continuation-in-part of our application Ser. No. 824,223, entitled "Vehicle Electric Motor Drive System," filed May 13, 1969 and having the same assignee as this application.

Electrically driven vehicles may employ a diesel, gasoline, or turbine engine as the primary source of power, or prime mover. The prime mover may drive one or more generators which, in turn, power one or more electric motors connected to the wheels or tracks of the vehicle. On wheeled vehicles it is often advantageous to utilize a separate motor for each wheel. An electric control may be interposed between the engine-driven generators and the motors of such a vehicle to regulate the application of electrical power to the motors and wheels.

In the past, most electrically driven vehicles have utilized direct current electrical apparatus. Direct current motors, particularly those of the series types, are readily adaptable to electric drive systems because of their ease of control, and further the electrical controls for direct current motors and generators are simple and well developed. However, the commutators and rotating armature coils required by direct current machines add to their manufacturing and maintenance cost.

Electrically driven vehicles are known which employ alternating current motors that are simple and reliable in construction. However, since the speed of an alternating current motor is determined by the frequency of the alternating current source, a control must be provided to convert the fixed frequency of the source to the required motor frequency which varies with speed.

The simplest type of alternating current motor is the induction motor, but the differential, or slip, between the speed of the rotor and that of the rotating stator field presents difficulties in using a frequency detector driven by the motor shaft for controlling the frequency converter which supplies the variable frequency to the motor stator. The stator frequency must be higher than the detected rotor frequency by the amount of the slip frequency, and further the slip results in heat losses in the rotor which are difficult to remove, particularly at low speeds. The torque of an induction motor is proportional to the square of the voltage-to-frequency ratio applied to the stator winding. For constant power and constant r.p.m. slip conditions, the voltage applied to an induction motor over a desired speed range must increase as the square root of the applied frequency. In a typical instance of 16 to 1 frequency (and motor speed) range at constant power, the maximum supplied voltage required is four times the minimum voltage. Inasmuch as the size of the power supply in a drive system, including the generator and power controlling elements, is determined by the maximum voltage required as well as the maximum current required, a large power supply is necessary for an electric drive system using induction motors.

Because the speed of a synchronous motor is inherently proportional to applied frequency, synchronous motors have generally been employed in constant speed drive systems where the motor is energized from a constant frequency source such as a 60 cycle per second power line. When energized at this frequency, the torque of a synchronous motor assumes a level sufficient to cause the motor to drive the load in synchronism with the rotating stator field. Such conventional synchronous motor operation is one of constant speed, variable power due to the variable motor torque.

It is an object of the invention to provide an electrically driven vehicle which has the following advantages over vehicles wherein power is transmitted from the prime mover to the wheels by clutches, shafts, gears, and transmissions:

a. infinitely varied control of speed and power;
b. operation of the vehicle prime mover at constant speed for maximum available power regardless of vehicle speed;
c. adaptability to automatic controls and protective features;
d. greater operating efficiency and reliability;
e. ease of maintenance and repair;
f. adaptability to different types of prime movers and vehicles;
g. location of powered wheels and the prime mover not restricted by the mechanical transmission elements, thereby permitting use in articulated and tandem vehicles;
h. power applied to the tractive elements of the vehicle may be individually selected and controlled, thereby permitting steering by controlling the power and speed of the tractive elements on either side of the vehicle;
i. electric braking may be provided to the vehicle thereby reducing the wear, maintenance, and required capability of the mechanical brakes.

It is a further object of the invention to provide a vehicle driven by electric motors which have no armature coils, commutator rings or brushes and are capable of rotation at higher peripheral speeds and are easier to cool than other types of electric motors heretofore used to propel vehicles.

It is another object of the invention to provide a vehicle driven by electric motors of the synchronous type which are easily controlled to produce torque directly proportional to the voltage-to-frequency ratio applied to the stator winding.

It is a further object of the invention to provide a vehicle driven by electric motors of the synchronous type which are readily controlled to provide constant power over a wide speed range without increasing the applied voltage, thereby permitting use of a small power supply.

It is another object of the invention to provide an electric vehicle driven by synchronous motors wherein motor speed is always directly proportional to the frequency of the applied voltage and thus frequency detecting means driven by the motor can be efficiently utilized to control the frequency converter which supplies variable frequency power to the motor.

It is still another object to provide a vehicle driven by alternating current electric motors of the synchronous type which provide better power factor and efficiency than induction motors.

A still further object of the invention is to provide a vehicle having a variable frequency electric drive system which utilizes a frequency changer that permits bidirectional power flow to provide regenerative braking.

A further object is to provide a vehicle having an electric drive system that transmits the maximum available power of the prime mover to the tractive elements at all vehicle speeds.

Another object is to provide such a vehicle having an electric drive system wherein, under constant power from the prime mover, maximum torque is provided to the vehicle under starting or low speed conditions.

Another object of the invention is to provide a vehicle having a variable frequency electric propulsion system utilizing a synchronous motor which permits use of a generator and a frequency changer having a voltage rating substantially lower than that of known electric drive systems of equal horsepower.

A further object of the invention is to provide an electrically driven vehicle having speed limit means which permit the operator to select the maximum speed at which the vehicle will travel and to do so even though the power pedal is fully depressed, thereby assuring the safety of the operator when the vehicle is traveling down grade.

It is a further object of the invention to provide an electrically driven vehicle wherein the operator may select the direction of vehicle travel and set a maximum speed limit for the vehicle by manipulating a single control lever.

A still further object of the invention is to provide an electrically driven vehicle having means for regeneratively braking the electric motors controlled by either a brake pedal or by manually set speed limit means.

Another object of the invention is to provide an electrically driven vehicle having means to increase the torque of outside wheels and to decrease the torque of the inside wheels on a turn as a function of the angle through which the front wheels are turned and the vehicle power being developed, thereby facilitating turning of the vehicle.

Still another object of the invention is to provide an electrically driven vehicle wherein the torque of the electric motors which propel the wheels is controlled by a manually operated power pedal.

A further object is to provide such a vehicle wherein the power pedal actuates means for selectively deriving a power signal which controls the torque of the motors, and wherein manually controlled brake pedal means selectively derive a brake signal which cancels the power signal at a predetermined partial brake pedal position even though the power pedal is fully depressed.

Another object is to provide such a vehicle having means for controlling the power output of the electrical motors as a function of the difference between the power signal and the brake signal.

Still another object is to provide such a vehicle having means for comparing the brake and power signals to derive a difference signal and brake sense means responsive to one polarity of said difference signal to regeneratively brake the electric motors.

Another object of the invention is to provide an electrically driven vehicle in which the phase of the voltage applied to the electric motors is shifted 180° to regeneratively brake the motors and thus brake the vehicle.

A still further object of the invention is to provide an electrically driven vehicle in which the phase of the voltage applied to the electric motors is shifted to reverse the direction of the motors and thus drive the vehicle in reverse.

Another object is to provide such an electrically driven vehicle wherein the amount of power flowing in reverse through the frequency converter to regeneratively brake the motors is a function of the brake pedal signal regardless of whether the vehicle is being driven forward or in reverse.

A further object is to provide an electrically driven vehicle having a prime mover, electrical generator means driven by the prime mover, an electric motor operatively connected to each tractive element, and control means between the generator means and each motor for independently regulating the power supplied to the motor.

Another object is to provide such an electrically driven vehicle wherein each motor assumes a speed in accordance with the load on the wheel driven by it even though each control means receives the same input control signal.

Another object is to provide such a vehicle having means associated with each motor for generating an output signal which is a function of motor speed, a frequency converter between the generator means and the motor controlled by the output signal, and control means for selectively varying a condition of the output signal.

Still another object is to provide such a vehicle having means for selectively deriving a power signal which is a function of the desired tractive effort of the vehicle, means associated with each motor for generating a speed signal which is a function of its speed, and wherein said control means for each motor independently regulates the phase and magnitude of the output signal which controls the frequency converter as a function of the power signal and the speed signal.

These and other objects and advantages of the invention will be more readily apparent from the following detailed description when considered in conjunction with the accompanying drawings wherein:

FIG. 3 is an exploded perspective view of the electric motor and the angle sensor driven by it in the embodiment of FIGS. 1 and 2, the motor stator and windings being shown as encapsulated in resin;

FIG. 4 is a partial front view showing the rotor and stator of the angle sensor;

FIG. 5 is a graph plotting relative torque provided by the electric drive system versus relative speed;

FIG. 6 is a graph showing the no-load saturation curve and the rated armature current, zero power factor saturation curve for the electric motor of the embodiment of FIGS. 1—5;

FIG. 7a shows the simplified equivalent circuit of the electric motor; FIG. 7b shows its vector diagram for motor operation; and, FIG. 7c shows its vector diagram for generator operation;

FIG. 8 is a graph plotting motor terminal voltage and displacement angle versus speed required to provide maximum rated power over the speed range;

FIG. 9 is a development of the angle sensor stator and rotor and also schematically illustrates the instantaneous voltages generated in the angle sensor secondary windings;

FIGS. 10a and 10b are schematic diagrams illustrating vector addition of the two input signals to the angle sensor primary windings to derive the output signal which controls the cycloconverter;

FIG. 13 is a schematic circuit diagram of the function generators of the angle sensor control;

FIG. 14 is a schematic circuit diagram of the cycloconverter and filter and showing the firing circuit in block form;

Figure 21:
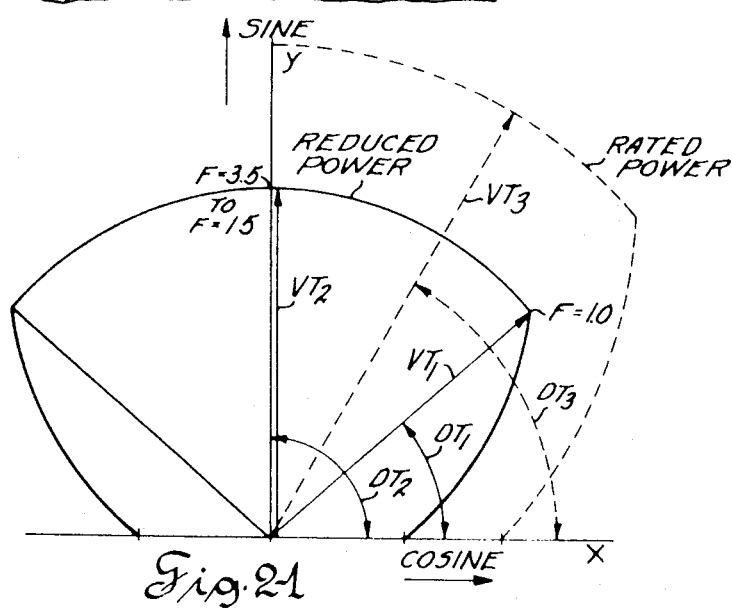
Figure 22:
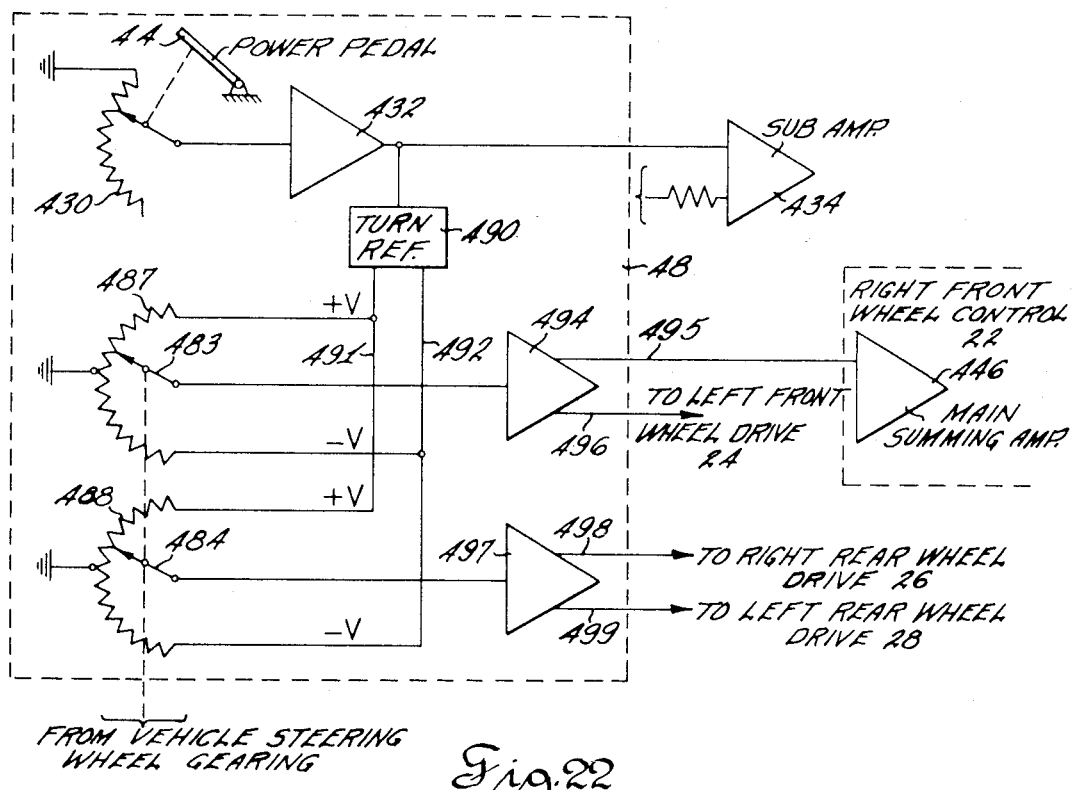

FIGS. 15a through 15h schematically illustrate voltages in the cycloconverter of the electric drive system;

FIG. 16 is a schematic circuit diagram of the tachometer;

FIG. 17a is a schematic circuit diagram, partially in block form, of the firing circuit for the controlled rectifiers of the cycloconverter; and FIGS. 17b through 17j show signals at various points within the firing circuit of FIG. 17a;

FIG. 18 is a simplified schematic diagram of the relay logic circuit and the motor control;

FIG. 19 is a graph plotting the output voltage VR from current control amplifier versus motor speed;

FIG. 20 is a graph plotting motor field current versus power pedal position to provide constant power over the speed range for a selected power level;

FIG. 21 shows curves plotting as polar coordinates the variation of motor terminal voltage VT and displacement angle DT with motor speed illustrated in FIG. 8;

FIG. 22 is a schematic circuit diagram of the turn compensation means; and

Figure 23:
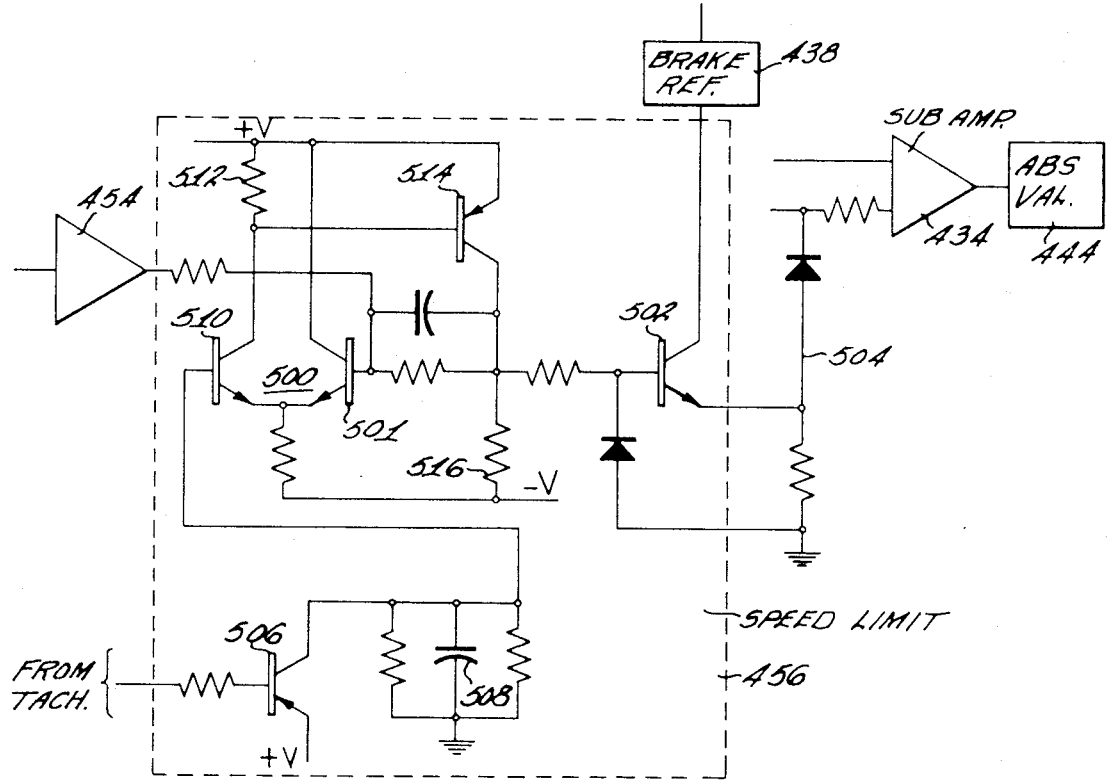

FIG. 23 is a schematic circuit diagram of the speed limit circuit.

GENERAL DESCRIPTION

Figure 1:
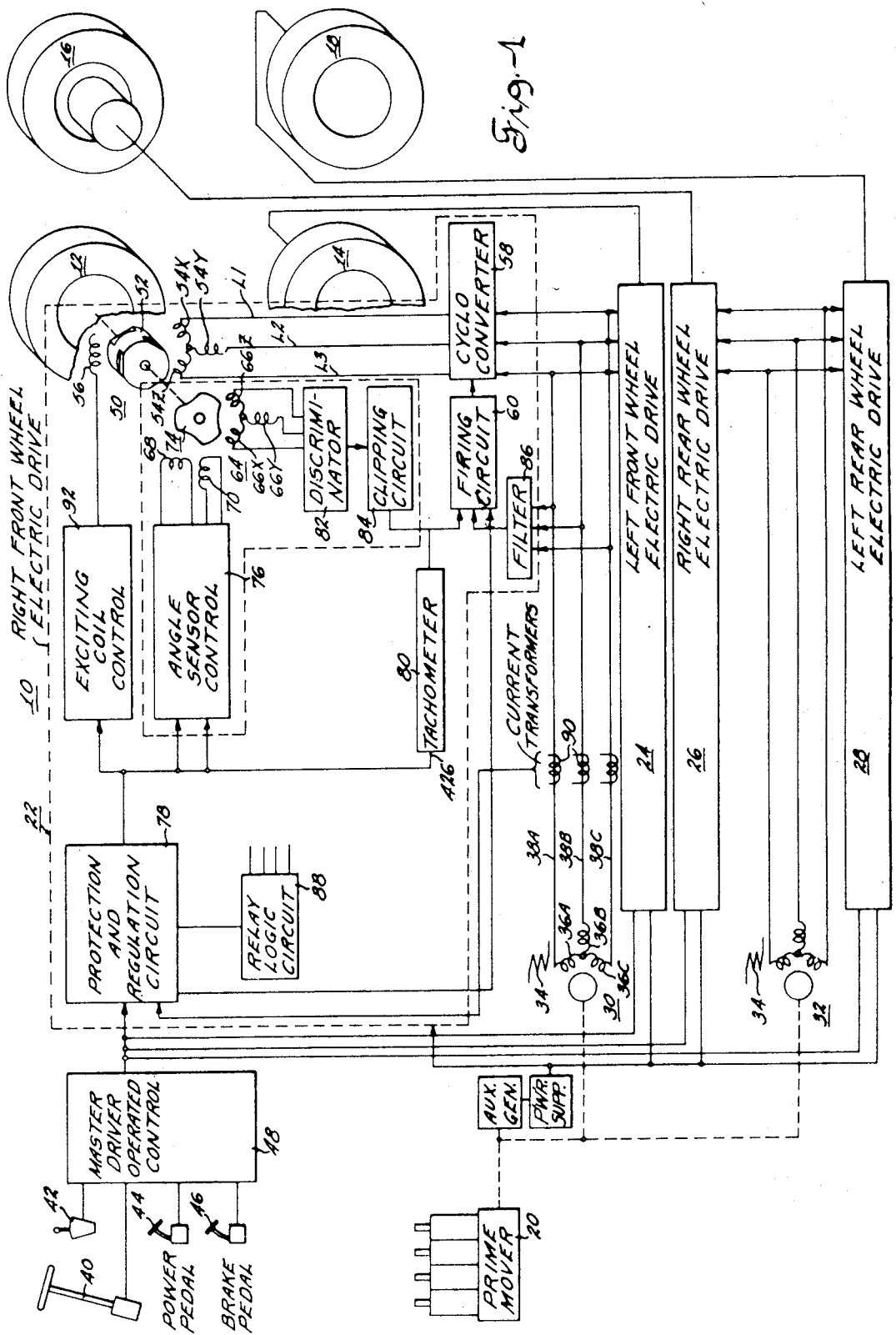
FIG. 1 is a schematic diagram in block form of the electric drive system of a vehicle embodying the invention.

Referring to FIG. 1, a vehicle embodying the invention has an electric drive system 10 which provides motive power to the right front, left front, right rear and left rear wheels 12, 14, 16 and 18 of the vehicle, respectively. A prime mover on the vehicle is preferably a hydrocarbon-fueled engine such as a gas turbine or a diesel engine 20 which operates at substantially constant speed, as determined by the setting of its governor, and is capable of providing constant power input to electric drive system 10 under all conditions of vehicle operation.

Electric drive system 10 preferably includes four electric controls, or drives 22, 24, 26 and 28 (shown in block form) for the wheels 12, 14, 16 and 18 respectively. All four drives are substantially identical, and only drive 22 for right front wheel 12 will be described.

Prime mover 20 drives a first generator 30 which provides electrical power for electric drives 22 and 24 that operate front wheels 12 and 14 and also drives a second generator 32 which provides electrical power for electric drives 26 and 28 which operate the vehicle rear wheels 16 and 18. Generators 30 and 32 are similar and may be conventional high frequency polyphase alternators, and only generator 30 will be described. Generator 30 preferably has a stationary exciting coil 34 energized from a suitable power supply (not shown)

and three wye-connected armature windings 36A, 38B and 36C which generate three-phase alternating current voltages A, B and C in high frequency, constant power buses 38A, 38B and 38C respectively. Prime mover 20 runs at nearly constant speed so that the input power to electric drive system 10 and the frequency of the alternating current generated by generators 30 and 32 are nearly constant.

The input signals to electric drives 22, 24, 26 and 28 which control the transmission of power from generators 30 and 32 to vehicle wheels 12, 14, 16 and 18 are preferably derived from conventional driver-operated vehicle controlling apparatus including a steering wheel 40, a travel direction and speed limit selector 42, a power pedal 44, and a brake pedal 46 which are coupled through a master driver-operated control circuit 48 to electric drives 22, 24, 26 and 28.

Electric drive 22 includes a synchronous motor 50 which preferably is of the inductor type and has a rotor 52 mechanically coupled to right front wheel 12 through appropriate gearing (shown in FIG. 2), a three-phase armature winding, or stator winding 54, and a field winding 56 mounted on the motor stator. Electric drive 22 converts the constant frequency, constant voltage output of high frequency generator 30 to a variable frequency, variable voltage, variable phase alternating current for application to armature winding 54 to regulate the torque and speed of synchronous motor 50.

Electric drive system 10 transmits the constant power output of prime mover 20 to the vehicle wheels 12, 14, 16 and 18 over a wide range of speed. The hyperbolic torque versus speed characteristic of electric drive system 10 to accomplish such transmission of constant power from prime mover 20 to the vehicle wheels over a speed range of 15 to 1 is shown in FIG. 5. Torque and speed are conveniently related for purpose of description to base values taken at the minimum speed at which constant maximum power is transmitted. The base rating of electric drive system 10 wherein relative torque is arbitrarily designated 1.0 and relative speed designated 1.0 is shown in FIG. 5 wherein the full line curve corresponds to the maximum power capability of diesel engine 20 with power pedal 44 fully depressed and with total power equally divided between the individual wheel drives 22, 24, 26 and 28. However, drive system 10 includes means described hereinafter to reduce motor torque under operating conditions requiring less than rated power as represented by the dotted line curve designated "reduced power" in FIG. 5. Vehicle speed, motor speed, and motor frequency are all directly proportional because of the use of synchronous motors 50 and the fixed ratio gearing between motors 50 and wheels 12, 14, 16 and 18. Further, motor torque and vehicle tractive effort are also directly proportional because of such fixed ratio gearing.

In the preferred embodiment of the invention motor 50 is of the synchronous inductor type, although any type synchronous motor having adjustable field excitation, including the conventional salient pole type, may be used in electric drive system 10. The conventional saturation curves of synchronous motors are commonly used to show the relationship between stator terminal voltage VT and field current $I_f$ for various load conditions. Since synchronous motors are usually operated at constant speed corresponding to a terminal voltage having a fixed frequency of 60 cycles per second, such saturation curves are usually shown for a fixed frequency. The effect of armature resistance on these synchronous motor characteristics is usually small but becomes increasingly significant as the frequency approaches zero.

When synchronous motor 50 is operated at variable frequency, as in electric drive system 10, more meaningful saturation curves which illustrate the effects of frequency variation and armature resistance at low speeds can be derived by replacing the terminal voltage VT by the variable $(\overline{VT}+\overline{I_a}R_a)/F$ as illustrated in FIG. 6 which shows the no-load saturation curve and the rated armature current, zero power factor saturation curve for a typical synchronous motor 50 suitable for electric drive system 10 and where:

VT is the motor terminal voltage;

$I_a$ is the armature current;

$R_a$ is the effective armature resistance; and

F is the frequency.

It will be noted that the values shown in FIG. 6 are expressed as per unit quantities relative to the base rating of the motor.

The vector quantity $\overline{VT}+\overline{I_a}R_a$ is an internal voltage, commonly called the voltage behind the resistance, and represents the vector sum of the terminal voltage and the armature resistance drop, observing the appropriate phase angle between the two vectors. Commonly used convention considers the power component of armature current to be positive for generator operation and negative for motor operation. Therefore, for motor operation the vector $\overline{VT}+\overline{I_a}R_a$ is less than VT for power factors in the normal operating range near unity where VT and $I_a$ are displaced approximately 180° (see FIG. 7b). The total quantity $(\overline{VT}+\overline{I_a}R_a)/F$ is proportional to the net magnetic flux linking the armature winding of motor 50, which net magnetic flux is the resultant of that generated by the armature winding 54 and field winding 56.

The saturation curves of FIG. 6 permit close approximation, by well-known methods, of the field current $I_f$ corresponding to any load condition. In the preferred embodiment of the invention, electric drive 22 holds the field current $I_f$ in motor 50 constant for a desired armature current corresponding to a given position of power pedal 44. As motor speed and frequency increase above the base value F=1.0, the electric drive 22 of the preferred embodiment also holds the terminal voltage VT constant for a given power pedal position, thereby resulting in the net magnetic flux, as represented by variable $(\overline{VT}+\overline{R_a}I)/F$ decreasing very nearly inversely proportional to frequency F. These conditions are represented in FIG. 6 for rated armature current by the vertical line at $I_f$=2.5 designated "constant $I_f$ for $I_a$=1.0," and it will be noted that the variable $(\overline{VT}+\overline{I_a}R)/F$ decreases from a value of 1.0 at frequency F=1.0 along this constant field current line to a value of 0.5 at frequency F=2.0 and then decrease further to a value of 0.2 at F=5. Below frequency F=1.0, the terminal voltage VT is reduced by electric drive 22 as described hereinafter but at a rate that results in the net flux rising to a maximum as the frequency approaches zero. With the field current $I_f$ and terminal voltage VT constant, the armature current $I_a$ is close to rated value ($I_a$=1.0) and the power factor close to unity over the entire range of frequency, thereby resulting in the electric drive system 10 having the hyperbolic constant power speed-torque characteristic shown in FIG. 5. Assuming that electric drive system 10 is designed to have a power rating matching that of diesel engine 20, this speed-torque curve of FIG. 5 might alternatively be designated "maximum electric drive system continuous capability." When less than rated power is required to drive the load and power pedal 44 is not fully depressed, the speed-torque characteristic may be represented by the dotted line curve designated "reduced power" in FIG. 5.

Electric drive 22 regulates the terminal voltage VT applied to armature winding 54 of electric motor 50 as described above and also shifts the applied terminal voltage VT through the required phase angle relative to the angular position of the rotor to obtain the constant power torque-speed characteristic shown in FIG. 5. Such required phase angle is best described by reference to FIG. 7a, which shows the simplified equivalent circuit of synchronous motor 50 under steady state conditions, and to FIGS. 7b and 7c which show its vector diagram for motor and generator operation respectively and wherein:

$E_D$ is the internal voltage proportional to the field current;

$X_s$ is the effective synchronous reactance for all field positions relative to the armature m.m.f.; and $R_a$ is the effective armature resistance.

The armature current $I_a$ results from the vector voltage difference acting on the machine impedance, and thus:

s) $a=(\overline{E_D}-\overline{VT})/(R_a+jX_s)$ and $\overline{E_D}=\overline{VT}+\overline{I_a}(R_a+jX_s)$ FIG. 7b illustrates the vector diagram of this relationship for motor operation approximating the conditions in electric drive 22 at rated load for speed F=1.0, and FIG. 7c illustrates the vector diagram for generator operation approximating the conditions in electric drive 22 at speed F=1.0, with braking power less than rated load. The displacement angle DT is the phase angle between the internal voltage $E_D$ and the the terminal voltage VT applied to stator winding 54.

Electric drive 22 advances the terminal voltage VT in phase by the angle (+)DT relative to the physical axis of the internal voltage $E_D$ on the rotor in order to produce the conditions for motor operation illustrated in FIG. 7b, and it delays the terminal voltage in phase by the angle (−)DT relative to the physical axis of $E_D$ in order to provide the conditions for generator action shown in FIG. 7c.

In the equivalent circuit and vector diagram of FIG. 7, the internal voltage $E_D$ and effective synchronous reactance $X_s$ are proportional to frequency and are multiplied by F for operation at other than base frequency F=1.0.

FIG. 8 illustrates the terminal voltage VT and displacement angle DT which electric drive 22 applies to stator winding 54 of synchronous motor 50 at rated load to provide the desired constant power speed-torque characteristic of FIG. 5 with constant field current, essentially constant armature current and power factor close to unity. It will be noted that the displacement angle DT is 0° at F=0.0 and approaches 90° at high frequency and motor speed. FIG. 8 shows only two VT curves designated "rated power" and "reduced power," but it will be appreciated that a different VT curve exists for each position of power pedal 44 and the corresponding power output level from motor 50.

Electric drive 22 includes a frequency changer, or cycloconverter 58 which is supplied with constant voltage, high frequency power from generator 30 over buses 38 and is responsive to gating signals from a firing circuit 60 to convert this high and constant frequency power to a lower variable frequency terminal voltage VT supplied over conductors 62 to stator phase windings 54X, 54Y and 54Z of synchronous motor 50. Cycloconverter 58 is shown in detail in FIG. 14 and preferably includes a positive group of three thyristors, or silicon controlled rectifiers associated with each of the three motor stator phase windings 54X, 54Y and 54Z to carry positive current from the three-phase power busses 38A, 38B and 38C and a negative group of three silicon controlled rectifiers associated with each of these three motor stator phase windings to carry negative current from the busses 38A, 38B and 38C.

Firing circuit 60 derives gating signals which cyclically fire the silicon controlled rectifiers in cycloconverter 58 at desired points in the cycles of the high frequency, constant magnitude voltages A, B and C in busses 38A, 38B and 38C to generate the three-phase voltages in conductors L1, L2 and L3 which are applied to stator phase windings 54X, 54Y and 54Z.

Electric drive 22 includes a rotary inductor, vector adder, or resolver, termed "angle sensor" 64 driven by motor 50 for deriving a control signal for cycloconverter 58 which is a replica in magnitude, frequency and phase of the voltage VT (shown in FIG. 8) to be applied to stator winding 54 to obtain constant power over the speed range. In order to keep the poles generated in motor rotor 52 locked in with the revolving poles generated by motor stator winding 54, the frequency of the terminal voltage VT applied to stator winding 54 must at all times be in synchronism with rotor speed, and further the terminal voltage must be advanced in phase at all motor speeds by the displacement angle DT between the magnetic flux produced by the field current acting alone and the magnetic flux corresponding to the terminal voltage. Further, the magnitude of the terminal voltage VT impressed on stator winding 54 must be controlled as a function of motor speed in the manner shown in FIG. 8.

The variation in magnitude VT and phase angle DT of the terminal voltage shown in FIG. 8 to be applied to stator winding 54 can be expressed graphically by the loci of an equation in which motor speed is the variable parameter and the magnitude VT and phase angle DT are the radius vector and vectorial polar coordinates of the curve formed by the loci. FIG. 21 shows such a curve in dotted lines designated "rated power" plotting the loci of terminal voltage VT and phase angle DT when motor 50 is delivering rated power and also shows a curve in full lines designated "reduced power." The magnitude of the terminal voltage VT to be applied to stator winding 54 as a function of motor speed is the radius vector of such curve, two such vectors VT1 and VT2 for the reduced power curve being shown in FIG. 21. The displacement angle by which the terminal voltage is to be advanced in phase relative to the rotor poles as a function of motor speed is the vectorial angle of the curve, two vectorial angles DT1 and DT2 for the reduced power curve being shown. It will be noted that the magnitude of the terminal voltage VT is maintained constant from the base speed F=1.0 at the lower limit of the speed range (shown by vector VT1 having phase angle DT1) with increase in motor speed, while the displacement angle increases from approximately 40° at F=1.0 to approximately 90° at speed F=3.5, at which the terminal voltage is shown by the radius vector VT2 and the displacement angle by the vectorial angle DT2.

A plurality of different curves can be plotted in FIG. 21 all of which are of the same shape and each of which represents a different position of power pedal 44 and a corresponding different power output level from motor 50. Each curve shown in FIG. 21 can also be defined by its rectangular coordinates x and y which vary as a function of motor speed F, or by the parametric equations of the curve having motor speed F as the variable parameter. Electric drive 22 includes an angle sensor control 76 which generates a pair of "sine" and "cosine" signals $V_s$ and $V_c$ representative of the y and x rectangular coordinates of a curve of FIG. 21 for each position of power pedal 44, and angle sensor 64 vectorially adds such signals and derives an output signal for controlling cycloconverter 58 whose magnitude and phase are in accordance with the radius vector and vectorial angle polar coordinates of such curve. Inasmuch as a curve of FIG. 21 is the loci of an equation which expresses the desired variation in magnitude VT and phase angle DT with motor speed as shown in FIG. 8, the terminal voltage VT applied by cycloconverter 58 to motor stator winding 54 is in accordance with one of the curves of FIG. 8 corresponding to a given power pedal position. As explained in detail hereinafter, the output signals from angle sensor 64 regulate firing circuit 60 which derives the gating signals for firing the thyristors of cycloconverter 58.

Rotary inductor, vector adder, or angle sensor 64 in effect converts the signals $V_s$ and $V_c$ representative of the y and x rectangular coordinates of a curve of FIG. 21 into the polar coordinates of such curve. Angle sensor 64 has a secondary winding 66 comprising three wye-connected secondary phase windings 66X, 66Y and 66Z displaced 120° (electrical) and a pair of energizing, or primary windings, termed sine winding 68 and cosine winding 70, displaced 90° electrically from each other magnetically coupled with secondary winding 66. The primary windings 68 and 70 and the three phase secondary windings 66X, 66Y and 66Z are wound on all angle sensor stator 72 (see FIGS. 2, 3 and 4) mounted on the housing of motor 50, and the magnetic flux linkage between the secondary winding 66 and the primary windings 68 and 70 depends on the airgap between the stator 72 and a ferromagnetic rotor 74 connected to the motor rotor 52. The angle sensor rotor 74 is contoured to produce an approximately sinusoidal variation in the air gap and in the flux linkage between each secondary phase winding 66X, 66Y and 66Z and the primary windings 68 and 70 as it rotates.

The sine and cosine primary windings 68 and 70 are separately excited with high frequency, in-phase sine and cosine signals $V_s$ and $V_c$ from angle sensor control 76 which are in accordance with the y and x rectangular coordinates respectively of a curve of FIG. 21 corresponding to a given position of power pedal 44. If motor 50 is at standstill and the angle sensor control 76 were to energize the sine and cosine windings with fixed magnitude, in-phase, high frequency alternating signals, the 90° displaced sine and cosine windings 68 and 70 would have constant ampere turns and induce fixed magnitude, high frequency signals in the three-phase secondary windings 66X, 66Y and 66Z. The permeances of the paths for the magnetic flux generated by the sine and cosine windings 68 and 70 and the voltage level of the fixed amplitude signals induced in the three-phase secondary windings is a function of the position of angle sensor rotor 74. When motor 50 rotates, the high frequency angle sensor output voltages induced in secondary windings 66X, 66Y and 66Z are no longer fixed in amplitude but rather have a sinusoidal modulation at a relatively low frequency which is representative of the speed of the motor 50. The envelopes of the three angle sensor output signals induced in the secondary phase windings 66X, 66Y and 66Z are displaced 120° (electrical) because of the physical location of these windings on the angle sensor stator 72.

The term "output voltage" is used herein to connote either the carrier frequency signals induced in secondary phase windings 66X, 66Y and 66Z, their low frequency sinusoidal modulation envelopes, or the signals derived therefrom by demodulation to remove the carrier frequency and alternate half waves. The carrier frequency signals induced in secondary phase windings 66X, 66Y and 66Z are designated $vt_s$ and their low frequency modulation envelopes and the signals derived therefrom by demodulation are designated $VT_s$. Further, all three such forms of "output voltage" are directly proportional in magnitude, and their magnitude is represented in curves by the designation $VT_s$.

Angle sensor control 76 receives a reference "power" signal from protection and regulation circuit 78 (see FIG. 1) which is a function of the position of power pedal 44 and independently controls the signals $V_s$ and $V_c$ to sine and cosine windings 68 and 70 of angle sensor 64 as a function of this power signal, thereby controlling the ampere turns of these windings and the magnitude of the signals $vt_s$ (and their modulation envelopes $VT_s$) induced in secondary phase windings 66X, 66Y and 66Z which, after demodulation, control cycloconverter 58. Thus angle sensor control 76 suitably regulates the magnitude of the signals $V_s$ and $V_c$ to the sine and cosine windings 68 and 70 of the angle sensor 64 to control the magnitude of terminal voltage VT applied to the motor stator winding 54 as a function of power pedal position. Change in position of power pedal 44 varies the magnitude of the power signal and thus changes the length of the radius vector VT in FIG. 21.

Angle sensor control 76 also receives a "speed" signal from tachometer 80 (see FIG. 1) which is a function of the speed of the motor 50 and modifies the signals $V_s$ and $V_c$ to the sine and cosine windings 68 and 70 in response to the speed signal in accordance with c y and x rectangular coordinates of a curve of FIG. 21 so that the angle sensor output voltages $VT_s$ induced in secondary windings 66X, 66Y and 66Z vary linearly (see FIGS. 8 and 11) from zero at zero speed to full value (corresponding to a given position of power pedal 44) at base frequency F=1.0 and remain at full value from F=1.0 to maximum motor speed F=15.0. Above base speed F=1.0, angle sensor control 76 unequally varies the magnitude of the signals $V_s$ and $V_c$ to the sine and cosine windings 68 and 70 in opposite directions as a function of motor speed (see FIG. 11) while maintaining the magnitude of the angle sensor output voltage $VT_s$ constant for a given power pedal position, thereby unequally varying the ampere turns and the intensity of the magnetic flux which these windings 68 and 70 generate and shifting the phase of the modulation envelopes $VT_s$ of the angle sensor output voltages induced in secondary windings 66X, 66Y and 66Z relative to the angular position of the angle sensor rotor 74 while maintaining the magnitude of these voltages constant. The output signals $VT_s$ from angle sensor secondary winding 66 control cycloconverter 58, and angle sensor control 76 thus regulates the displacement angle DT of the voltage VT applied to motor stator winding 54 relative to the magnetic poles on motor rotor 52 as a function of motor speed, while maintaining the magnitude of the terminal voltage VT constant for a given position of power pedal 44, by independently varying the magnitude of the sine and cosine signals $V_s$ and $V_c$ to sine and cosine windings 68 and 70 to obtain the terminal voltage versus speed and displacement angle versus speed characteristics designated VT and DT in FIG. 8.

The three-phase carrier frequency output voltages $vt_s$ from angle sensor secondary windings 66X, 66Y and 66Z are demodulated in a discriminator 82 to remove the carrier signal. Discriminator 82 provides three-phase output voltages $VT_s$ of motor frequency controlled in magnitude and phase angle relative to a reference axis or the motor rotor, i.e., the axis of internal motor voltage $E_D$ shown in the vector diagram of FIG. 7b.

The peak voltages of the low frequency output signals $VT_s$ from discriminator 82 are limited in a clipping circuit 84 which derives flat-topped output signals $VT_s'$ (see FIG. 12) when the voltages from the discriminator 82 exceed the clipping level.

When the speed of motor 50 can be regulated over a speed range wherein the motor frequency voltages $VT_s$ applied to stator winding 54 vary from zero to $f$ Hertz, the generator 30 provides voltages A, B and C having a frequency of at least $2f$ and preferably $3f$ when diesel 20 is controlled by its governor to run at top speed.

In order to condition the generator high frequency, constant magnitude voltages A, B and C in the busses 38A, 38B and 38C for generating the "synchronizing," or "sequence" signals required by firing circuit 60, a filter 86 (see FIG. 1) removes the commutation notches and high frequency noise from the generator voltages A, B and C and regulates the voltage level thereof to derive "reference" voltages which are reproductions of the fundamental waves of these generator voltages. Firing circuit 60 combines these three-phase, high frequency output "reference" signals from filter 86 with the three-phase low frequency control signals $VT_s'$ from clipping circuit 84 (which are proportional to the angle sensor output voltages $VT_s$) to derive the "sequence" signals $A+VT_s$, $B+VT_s$ and $C+VT_s$ shown in FIG. 15e, and the firing circuit 60 includes level detectors (described hereinafter) which sense the zero crossing points of such sequence signals and generate the gating signals for the controlled rectifiers of the cycloconverter 58.

As explained hereinbefore, the terminal voltages VT applied to stator winding 54 and displacement angles DT shown in FIG. 8 will result in the desired speed-torque characteristic of FIG. 5 with constant field current, essentially constant armature current, and power factor close to unity. Voltage drops occur in generator 30 because of the commutating inductance, and additional resistance and reactance voltage drops occur in the controlled rectifiers and center tapped reactors of cycloconverter 58, and the effect of such voltage drops on motor terminal voltage VT and on the controlling input signal voltage to cycloconverter 58 is approximately the same as that of an added resistance in series with the motor. The output voltage VT from cycloconverter 58 to motor stator winding 54 is proportional to, and a replica of, the angle sensor output voltage which controls cycloconverter 58 and would have the magnitude versus speed response of the VT curve in FIG. 8 if such voltage drops and the limiting of the peak voltages in clipping circuit 84 were not taken into consideration. In order to compensate for such voltage drops under load and also for the clipping of the $VT_s$ signals in clipping circuit 84, angle sensor control 76 increases the magnitude of the output signal from angle sensor 64 for rated load from a signal having the magnitude of the full line VT curve to that shown by the curve designated $VT_s$ and also varies the phase angle of the angle sensor output signal (which controls cycloconverter 58) in accordance with the curve designated $DT_s$ in FIG. 8 rather than along a characteristic similar in shape to the DT curve.

The position of power pedal 44, brake pedal 46 and travel direction selector 42 determine the magnitude of a DC reference "power" signal from master driver-operated control 48 which is supplied to the protection and regulation circuit 78 wherein its magnitude may be modified by input signals from a relay logic circuit 88, current transformers 90 which derive signals proportional to the currents in high frequency, constant voltage uses 38, and other means not shown in FIG. 1 to compensate for direction of vehicle motion, driving or braking of the vehicle, turn compensation, engine stalling or overspeeding, and overcurrent compensation as described in detail hereinafter. An exciting coil, or field winding control 92 regulates the excitation of field coil 56 of motor 50 as a function of the "power" signal from protection and regulation circuit 78. As described hereinbefore, angle sensor control 76 is responsive to the "power" reference signal from protection and regulation circuit 78 and to the "speed" signal from tachometer 80 and derives in-phase alternating signals $V_s$ and $V_c$ to the primary sine and cosine windings 68 and 70 required to produce the motor voltage VT and displacement angle DT shown in FIG. 8 at rated load as a function of motor speed. The constant power, torque-speed characteristic shown in FIG. 5 is obtained when the power pedal 44 is fully depressed and the maximum power from diesel engine 20 is delivered equally by motor 50 to the vehicle wheels 12, 14, 16 and 18. A characteristic for a condition less than rated load when power pedal 44 is only partially depressed may be represented by the curve designated "reduced power" in FIG. 5. The load conditions such as the surface and soil characteristics of the ground over which the vehicle wheels are passing determine the speed of motor 50 corresponding to the power called for by the position of power pedal 44, as modified by other inputs to protection and regulation circuit 78.

When power pedal 44 is operated to a new position calling for less than rated power, the magnitude of the reference "power" signal from protection and regulation circuit 78 is changed, thereby varying the excitation of field winding 56 and also varying the magnitude of the sine and cosine signals $V_s$ and $V_c$ and the low frequency output control signal $VT_s$ from angle sensor 64 and consequently changing the magnitude of the terminal voltage VT applied by cycloconverter 58 to armature winding 54. Electric drive 22 maintains the field winding current $I_f$ constant corresponding to such new position of power pedal 44 calling for less than rated power and regulates the sine and cosine signals $V_s$ and $V_c$ to sine and cosine winding 68 and 70 to provide a magnitude of terminal voltage VT to stator winding 54 which may be represented by the dotted curve designated "reduced power" in FIG. 8.

DETAILED DESCRIPTION

Synchronous Motor

Figure 2:
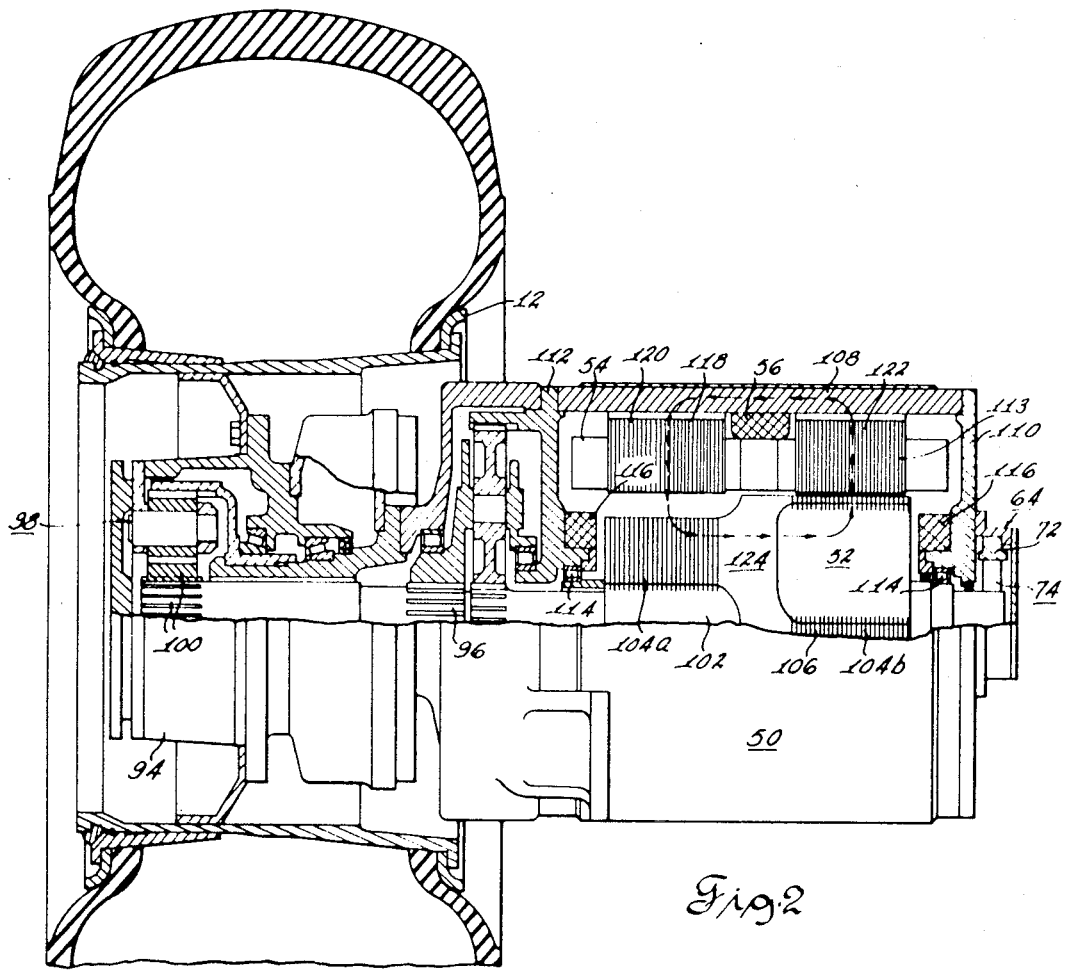
FIG. 2 is a sectional view through a vehicle wheel and the electric motor which drives it in the embodiment of FIG. 1.

Synchronous motor 50 is shown schematically in FIG. 1 and in detail in FIGS. 2 and 3 and preferably is of the inductor type. The rotor 52 is coupled to hub 94 of vehicle wheel 12 through a shaft 96 and a gear box 98 containing gears 100 which provide the desired stepdown ratio between motor 50 and wheel 12.

Rotor 52 is solid and preferably of ferromagnetic material such as steel and has circumferentially spaced, chordlike portions 102 at both ends. The circumferential portions 104 between the flat portions 102 have the smallest airgaps with the motor stator and form salient rotor poles when field coil 56 is energized. Motor 50 is shown and described as a six-pole motor, and the salient pole portions 104a at one end of rotor 52 are circumferentially displaced by 60° from the salient pole portions 104b at the other end thereof.

A plurality of axially spaced circumferential slots 106 may be provided in the salient pole portions 104 to reduce eddy current losses at high speeds and minimize heat generation. The surfaces of the rotor pole portions 104 may also be infused with silicon to increase resistivity and thus minimize eddy currents.

Motor 50 has a hollow housing formed by an annular yoke 108 closed at its open ends by end bells 110 and 112, and rotor 52 is rotatably supported within the motor housing by bearings 114 located in the end bells 110 and 112. Degaussing coils 116 supported on end bells 110 and 112 in surrounding relation to the bearings 114 generate magnetic fields which oppose the magnetic fields of stator winding 54 and field winding 56 to protect bearings 114 from overheating caused by eddy currents. The motor stator 118 is positioned on the inner periphery of yoke 108 and is formed of two axially spaced groups 120 and 122 of stator laminations each of which preferably has 36 radially inward extending teeth forming winding slots for stator winding 54. One lamination group 120 is positioned radially opposite the rotor poles 104a, while the other lamination group 122 is positioned opposite rotor poles 104b on the opposite end of rotor 52. The winding slots formed by the radial teeth in both groups of laminations 120 and 122 are in axial alignment, and a three-phase, six-pole, stator winding 54 of conventional diamond shaped configuration is positioned in the winding slots of both groups of stator laminations 120 and 122 with the coil sides extending through the aligned slots of both groups of laminations and the coil end turns located at the ends of stator 118.

The exciting, or field winding 56 is circumferentially wound and is located in the axial space between the two groups of stator laminations 120 and 122 and opposite the central circular portion 124 of rotor 52. The stator laminations 120 and 122 and armature coils 54 and exciting coil 56 may be encapsulated as a unitary assembly in a suitable thermosetting resin to provide mechanical strength and environmental protection.

Exciting coil 56 is energized by electric drive 22 with direct current and generates a toroidal magnetic flux field having a magnetic flux path shown in FIG. 2 by the series of arrows and it will be noted that the flux flows through yoke 108 parallel to the axis, radially inward through stator laminations 120 and the motor airgap into pole portions 104a on one end of rotor 52, axially through rotor 52, radially outward from pole portions 104b at the other end of rotor 52 and across the airgap and radially through stator laminations 122 and back to yoke 108. Adopting the convention that magnetic flux enters the south pole of a magnetic body and leaves the north pole, it will be appreciated that energization of exciting coil 56 makes salient portions 104a magnetic south poles and makes salient portions 104b magnetic north poles.

Stator winding 54 is energized with three-phase alternating current by cycloconverter 58 and generates a rotating magnetic field, and rotor 52 is turned in synchronism with the rotating magnetic field by the torque resulting from interaction between the magnetic poles created on the rotor 52 by the exciting coil 56 and the rotating magnetic field. Inasmuch as rotor 52 has no windings and no commutators, it can be rotated at higher peripheral speeds than prior art motors utilized to drive vehicles and also less heat is generated therein when the vehicle is at standstill.

Angle Sensor

The three phase rotary inductor, vector adder, or angle sensor 64 is disclosed in the copending application of William L. Ringland and Ernst K. Kaeser, Ser. No. 824,176, filed May 13, 1969, entitled Rotary Inductor, having the same assignee as the present invention and to which reference is made for details of construction. Angle sensor 64 vectorially adds two in-phase signals $V_s$ and $V_c$ representative of the y and x rectangular coordinates of a curve of FIG. 21 and generates an output signal of a frequency which, after demodulation, is a function of the speed of motor 50 and whose magnitude and phase angle are the polar coordinates of such curve. The preferred embodiment of angle sensor 64 shown in FIGS. 1—4 and 9 includes a stator 72 mounted at the end of the motor housing and comprising a plurality of annular, silicon steel laminations 128 each of which has 36 radially inward extending teeth 130. One primary coil 132 (see FIG. 4) and at least one secondary coil 134 surround each tooth 130 and are inductively linked by the ferromagnetic tooth, and the permeance of the path for magnetic flux in each tooth, and thus the flux linkage between primary coil 132 and secondary coil 134 surrounding the tooth vary as the ferromagnetic angle sensor rotor 74 having three circumferentially spaced lobes 136 is rotated within stator 72 by motor 50.

Angle sensor rotor 74 may be constructed of stacked silicon steel laminations and is provided with radially inward extending portions, or valleys between the lobes 136 so that it has varying magnetic reluctance gaps, i.e., airgap spacings from teeth 1—36, for example, the smallest airgap spacing is from teeth 4, 16 and 28 at the rotor position illustrated in FIG. 9. The magnetic fluxes induced in teeth 1—36 by primary coils 132 flow in flux paths through the teeth and across the airgap into the rotor 74 and return through the stator 72. The permeances of the paths for the magnetic fluxes generated by primary coils 132 in teeth 1—36, and thus the voltage levels of the signals induced in secondary coils 134, are functions of the position of rotor 74. Rotor 74 is preferably contoured so that the permeances of the magnetic flux paths through teeth 1—36 and across the airgaps into the rotor 74 vary sinusoidally, thereby sinusoidally varying the flux linkage between the two coils 132 and 134 inductively linked by each tooth 130 as rotor 74 rotates. The sinusoidal flux modulation produced by rotor 74 is at the frequency of rotation of motor rotor 52. The magnetic flux linkage between the primary and secondary coils 132 and 134 on each tooth 130 is a maximum when a lobe 136 on rotor 74 is opposite a tooth 130 (and the airgap between rotor 74 and the tooth 130 is thus a minimum) and is a minimum when a valley between the lobes 136 is opposite a tooth 130 (and the airgap between rotor 74 and the tooth 130 is a maximum).

The eighteen odd-numbered teeth 1, 3, 5, 7, 9, etc. may be associated with the primary cosine winding 70 and are termed "cosine" teeth, and the eighteen even-numbered teeth 2, 4, 6, 8, 10, etc. may be associated with the primary sine winding 68 and are termed "sine" teeth. Synchronous motor 50 preferably has six poles, and since angle sensor rotor 74 is directly coupled to the motor rotor 52, the angle sensor 64 preferably has three pole-pairs. It may be considered that teeth 1—12 constitute one pole-pair, teeth 13—24 constitute a second pole-pair, and teeth 25—36 constitute a third pole-pair.

Cosine primary winding 70 may include the serially connected primary coils 132 wound in opposite directions on successive odd-numbered teeth such as 1, 3, 5, 7, 9, etc. starting on tooth 1 so that the magnetic fluxes are generated in opposite directions in successive cosine teeth, and for convenience of description teeth 1, 5, 9, 13, 17, etc. are arbitrarily termed "positive" cosine teeth and the direction of magnetic flux generated therein is shown by radially outward arrows in FIG. 9, and teeth 3, 7, 11, 15 are termed "negative" cosine teeth and the direction of magnetic flux flow therein is shown by radially inward arrows. Sine winding 68 (which is displaced one-half pole pitch or 90 electrical, i.e., 30 mechanical, degrees from cosine winding 70) may comprise the serially connected primary coils 132 wound on successive even-numbered teeth such as 4, 6, 8, 10, 12, 14, etc. starting at tooth 4 so that the magnetic fluxes are generated in opposite directions in successive sine teeth, and teeth 4, 8, 12, 16, etc. are arbitrarily termed positive sine teeth and the direction of magnetic flux generated therein is shown by radially outward arrows and teeth 6, 10, 14, 18, etc. are termed "negative" sine teeth and the direction of magnetic flux flow therein is shown by radially inward arrows. Considering such positive and negative directions of magnetic flux flow, the sum of the fluxes (although varying in each tooth) must be zero in total, or stated another way, the sum of the positive fluxes must equal the sum of the negative fluxes.

FIG. 9 is a schematic development of angle sensor stator 72 and rotor 74 and shows lobes 136 opposite teeth 4, 16 and 28 and only illustrates the coils 134 for one phase secondary winding 66Y of phase Y. Secondary winding 66Y for phase Y may start with a coil 134 on positive cosine tooth 1; secondary winding 66Z (not shown in FIG. 9) for phase Z may start with a coil 134 on positive cosine tooth 5 displaced 120 electrical (40 mechanical) degrees from tooth 1; and secondary winding 66X for phase X (not shown in FIG. 9) may start with a coil 134 on positive cosine tooth 9 displaced 120 electrical degrees from tooth 5.

In each pole-pair, a pair of 180° displaced positive and negative cosine teeth and a pair of 180° displaced positive and negative sine teeth are associated with each phase. For example, 180° displaced positive and negative cosine teeth 1 and 7 and 180° displaced positive and negative sine teeth 4 and 10 are associated with phase Y of the first pole-pair comprising teeth 1—12. In each pole-pair, each secondary winding such as 66Y has a pair of secondary coils 134 on positive and negative cosine teeth such as 1 and 7 connected in series with a pair of secondary coils 134 on positive and negative sine teeth such as 4 and 10. Secondary winding 66Y thus has a coil 134 wound to encircle positive cosine tooth 1 in the same direction as the cosine coil 132 thereon connected in series with a coil 134 wound to encircle negative cosine tooth 7 in the direction opposite to the cosine coil 132 thereon so that the voltages induced in these coils 134 subtract in relation to the instantaneous flux directions, thereby nullifying the effect of the base flux, and these coils 134 on cosine teeth 1 and 7 are connected in series with a coil 134 wound to encircle positive sine tooth 4 in the same direction as the primary sine coil 132 thereon and also connected in series with a coil 134 wound to encircle negative sine tooth 10 in the direction opposite to the sine coil 132 thereon so that the coils 134 on positive and negative sine teeth 4 and 10 are in series opposition to nullify the effect of the base flux.

The secondary coils 134 of all three such pole-pairs of phase secondary winding 66Y are connected in series as shown in FIG. 9, i.e., coils 134 on teeth 1, 4, 7 and 10 (which was arbitrarily termed one pole-pair) are connected in series with coils 134 on positive and negative cosine teeth 13 and 19 and on positive and negative sine teeth 16 and 22 of the second pole-pair, and also in series with coils 134 on positive and negative cosine teeth 25 and 31 and on positive and negative sine teeth 28 and 34 of the third pole-pair.

When motor 50 is at standstill and sine and cosine windings 68 and 70 are energized with fixed magnitude, in-phase alternating signals $V_s$ and $V_c$, the 90° displaced sine and cosine windings 68 and 70 generate magnetic fluxes of fixed magnitude which link the secondary coils 134 forming the respective three phase secondary windings 66X, 66Y and 66Z and induce fixed magnitude signals therein. The permeances of the paths for the magnetic fluxes generated in teeth 1—36 by the primary coils 132 forming the sine and cosine windings 68 and 70 (and the voltage level of the fixed magnitude signals induced in the three phase secondary windings 66X, 66Y and 66Z) are a function of the position of angle sensor rotor 74 which is directly coupled to synchronous motor 50. When motor 50 rotates, the carrier frequency voltages $vt_s$ induced in coils 134 defining secondary windings 66X, 66Y and 66Z are no longer fixed in amplitude but rather have a sinusoidal modulation at a frequency which is a function of the speed of motor 50. Rotor 74 is preferably contoured so that the permeances of the magnetic flux paths through teeth 1—36 and across the airgap into rotor 74 vary sinusoidally over a constant base flux to thus provide sinusoidal variation in the mutual coupling between the primary coil 132 and the secondary coil on each tooth as rotor 74 turns.

Assuming that an alternating signal $V_s$ is applied to primary winding 68 and that zero signal is applied to cosine winding 70, FIG. 9 schematically illustrates in full lines the sinusoidal modulation envelope $V_p$ of the instantaneous carrier frequency voltages $v_p$ induced in each of the coils 134 on the positive sine teeth 4, 16 and 28 as rotor 74 turns and thus moves the lobes 136 and the valleys alternately past these teeth. Several cycles of the carrier frequency signal $v_p$ induced in coil 134 positive sine tooth 4 are shown opposite this tooth. As illustrated in FIG. 9, the lobes 136 of rotor 74 are opposite positive sine teeth 4, 16 and 28, and consequently the permeances of the flux paths through these teeth at the rotor position shown are a maximum and also the amplitude of the modulation envelope $V_p$ of the carrier frequency voltages $v_p$ induced in coils 134 on these teeth 4, 16 and 28 is a maximum. FIG. 9 also illustrates in dotted lines the sinusoidal modulation envelope $V_n$ of the instantaneous carrier frequency voltages $v_n$ induced in each of the coils 134 on the negative sine teeth 10, 22 and 34 as the lobes 136 and valleys on the revolving rotor 74 sweep past these teeth. As the rotor position illustrated in this figure, the valleys on rotor 74 between lobes 136 are opposite negative sine teeth 10, 22 and 34, and consequently the permeances of the flux paths through these teeth at the rotor position shown are a minimum and also the amplitude of the modulation envelope $V_n$ of the carrier frequency voltages $v_n$ induced in coils 134 on teeth 10, 22 and 34 is a minimum. Several cycles of the carrier Frequency signals $v_n$ induced in coils 134 on negative sine teeth 10, 22 and 34 at the illustrated rotor position are shown in FIG. 9, and it will be noted that they are 180° out of phase from and subtract from the voltages $v_p$ induced in secondary coils 134 on positive sine teeth 4, 16 and 22 because these coils are connected in series opposition. It will be appreciated that the magnitude of voltage shown by the $V_n$ envelope directly opposite each negative sine tooth 10, 22 and 34 only represents the magnitude of the instantaneous voltage $v_n$ induced therein after 180 additional (electrical) degrees of rotation of rotor 74 from the position shown to the position wherein the lobes 136 would be opposite these teeth.

FIG. 9 also schematically shows in cross hatching the one-half cycle of instantaneous voltage $v_{ni}$ induced in the coil 134 on negative sine tooth 10 (at the rotor position shown) which is opposed to and subtracts from the one-half cycle of carrier frequency voltage $v_{pi}$ (shown in the opposite cross hatching) induced in coil 134 on positive sine tooth 4 at this rotor position to produce the resultant half cycle $v_s$ of carrier frequency voltage shown in checked cross hatching. The modulation envelope $VT_s$ of the resultant carrier frequency voltage $vt_s$ induced in secondary phase winding 66Y (under the assumed condition that an alternating signal $V_s$ is applied to sine winding 68 and that $V_c$ equals zero) is shown in dot-dash lines in FIG. 9.

Since each pole-pair of secondary phase winding 66Y has serially connected coils 134 linking both sine and cosine teeth displaced 90°, e.g., linking sine teeth 4 and 10 displaced 90° from cosine teeth 1 and 7 of the first pole-pair, the output signal generated by secondary phase winding 66Y when both sine and cosine energizing windings 68 and 70 are excited with signals $V_s$ and $V_c$ is the vector sum of such signals. The signals $V_s$ and $V_c$ which excite the sine and cosine windings 68 and 70 may be schematically represented by the perpendicular vectors $V_s$ and $V_c$ shown in FIG. 10. Change in speed of motor 50 (which varies the output from tachometer 80) alters the ampere turns of the sine and cosine energizing windings 68 and 70 and thus may be considered to change the length of the vectors $V_s$ and $V_c$. The magnitude of $V_s$ and $V_c$ may also be influenced by power pedal 44. The output signal induced in secondary phase winding 66Y by equal magnitude signals $V_s=1.0$ and $V_c=1.0$ may be represented by the resultant vector $VT_s$ (which is proportional to the high frequency signal $vt_s$) having a magnitude equal to 2 times $V_c$ or $V_s$ and shifted through the angle $DT_s$ equals 45° from both as illustrated in full lines in FIG. 10a.

Angle sensor output voltage $VT_s$ is in phase with and proportional in magnitude to the desired output voltage VT from cycloconverter applied to motor stator winding 54. FIG. 10a may thus represent the condition shown at speed F=1.1 in FIG. 11 where, for full power pedal, $V_c$ and $V_s$ are equal and have a magnitude of approximately 1.35 (relative) volts; the angle sensor output voltage $VT_s$ has a magnitude of 2 times 1.35 equals 1.9 (relative) volts and is displaced by an angle $DT_s$ equal to 45° from the internal voltage $E_D$ (see FIG. 7b) produced by field winding 56; and the motor terminal voltage VT is proportional in magnitude to the angle sensor output signal $VT_s$ and is shifted in phase by an angle DT (whose relationship to $DT_s$ is shown in FIG. 8).

The dotted line vectors in FIG. 10a represent the condition wherein the signals $V_s$ and $V_c$ to the primary sine and cosine windings 68 and 70 are doubled in comparison to those shown by the full line vectors $V_s=1.0$ and $V_c=1.0$ and illustrate that the resultant signal $VT_s$ induced in secondary phase winding 66Y may be increased, while maintaining the same displacement angle $DT_s$, by equally varying the signals $V_s$ and $V_c$.

If the cosine energizing winding 70 only is excited and zero signal applied to sine winding 68, the resultant voltage $VT_s$ induced in secondary phase winding 66Y is proportional to and in phase with the signal $V_c$ exciting the cosine winding 70. If zero signal is applied to the cosine winding 70 and the sine energizing winding is excited with a signal $V_s$, the resultant voltage $VT_s$ induced in phase secondary winding 66Y is proportional to and in phase with the sine signal $V_s$ and this represents a condition above speed F=3.5 in FIG. 11 wherein the displacement angle $DT_s$ of the angle sensor output voltage $VT_s$ (and the corresponding displacement angle DT between the terminal voltage VT applied to stator winding 54 and the internal voltage $E_D$ produced by exciting winding 56) is approximately 90°.

FIG. 10b illustrates that the modulation envelope $VT_s$ of the voltage $vt_s$ induced in angle sensor phase secondary coil 66Y may be shifted through an angle of 60° by energizing the sine winding 68 to a relative magnitude of 0.866 and the cosine winding to a relative magnitude of 0.5. The modulation envelope $VT_s$ of the resultant signal induced in phase secondary winding 66Y has a magnitude $\sqrt{(0.5)^2+(0.866)^2}=1.0$ and is displaced 60° from the cosine signal $V_c$.

The magnitude and phase angle of the voltages $VT_s$ induced in angle sensor secondary phase windings 66X, 66Y and 66Z may be changed in magnitude and may also be shifted in phase through 90° or a greater angle by altering the relative magnitude of the signals $V_s$ and $V_c$ to the sine and cosine primary windings 68 and 70 of rotary inductor, vector adder 64. Inasmuch as the input signal to cycloconverter 58 and the output voltage VT therefrom applied to motor stator winding 54 is controlled by the modulation envelopes $VT_s$ of the output signals from phase secondary windings 66X, 66Y and 66Z, it is possible to control the magnitude VT and phase angle DT of the voltage applied to motor stator winding 54 in accordance with the curves of FIGS. 8 and 21 by suitable programming of the signals $V_s$ and $V_c$ to the sine and cosine windings 68 and 70 as functions of position of power pedal 44 and of the output of tachometer 80 which measures motor speed.

It will be appreciated that with a six pole motor 50, the angle sensor 64 can comprise a single pole-pair of 12 teeth extending 360 mechanical degrees associated with a rotor having a single lobe and driven at three times the speed of the preferred embodiment of angle sensor.

Angle Sensor Control

Figure 11:
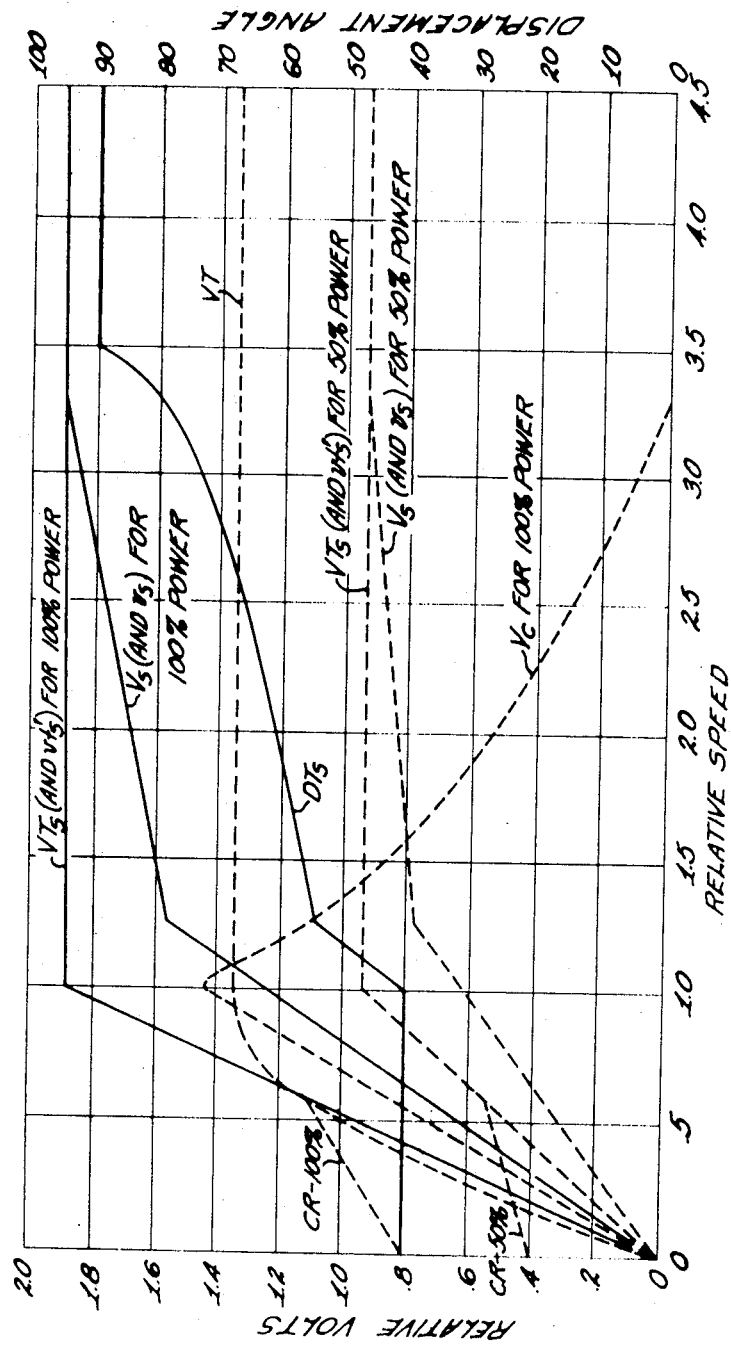
FIG. 11 is a graph plotting the motor and angle sensor voltages versus motor speed required to obtain constant 50 percent and 100 percent maximum power over the speed range.

Angle sensor control 76 provides the signals $V_s$ and $V_c$ to sine and cosine windings 68 and 70 in accordance with the y and x rectangular coordinates of a curve of FIG. 21 which angle sensor 64 vectorially adds and derives an output signal $VT_s$ (which is the modulation envelope of the instantaneous voltages $vt_s$) displaced through a phase angle $DT_s$ in accordance with the polar coordinates of said curve and which is a replica of the desired voltage at the terminals of motor stator winding 54, i.e., which will result in the desired output voltage VT from cycloconverter 58 applied to motor stator winding 54 having the displacement angle DT shown in FIG. 8 for each motor speed. The characteristics designated "$VT_s$ for 100 percent power" and "$VT_s$ for 50 percent power" in FIG. 11 are partial enlargements of the curve designated $VT_s$ in FIG. 8 and illustrate how the output voltage $VT_s$ after being demodulated in discriminator 82 and before being limited in clipping circuit 84 from angle sensor 64 (which controls the firing signals to cycloconverter 58) must vary with speed to provide constant power over the speed range. FIG. 11 also illustrates how the sine and cosine signals $V_s$ and $V_c$ to the sine and cosine windings 68 and 70 of angle sensor 64 vary with motor speed to produce the angle sensor output signal $VT_s$ for 100 percent power.

The means included in angle sensor control 76 for energizing sine winding 68 in accordance with the y rectangular coordinate of a curve of FIG. 21 (and also in accordance with a voltage versus speed characteristic similar to that designated $V_s$ in FIG. 11) includes a sine function generator 138 (see FIG. 12) which receives a "speed" signal over conductor 139 from tachometer 80 proportional to the speed of motor 50 and also receives a "power" signal over conductor 142 which is a function of the position of power pedal 44. Sine function generator 138 derives direct current signals $v_s$ whose magnitude varies with motor speed in accordance with a family of programmed voltage versus speed characteristics schematically illustrated in FIG. 12 each of which is associated with one position of power pedal 44 and is representative of the y rectangular coordinate of the curve of FIG. 21 for the power pedal position. It will be noted that these $v_s$ curves increase with speed and are of the same general configuration as the displacement angle versus speed characteristics designated $DT_s$ in FIG. 8 and in FIG. 11.

Sine function generator 138 is shown in FIG. 13 but not described herein and reference is made to parent application Ser. No. 824,223 for disclosure.

The DC output signal from sine function generator 138 on conductor 165 flows successively through a summing junction 166 (see FIG. 12) and an operational amplifier 168 to a modulator 170 which also receives an input from an oscillator 172 whose frequency may be 10 kilocycles per second. Modulator 170 preferably is a field effect transistor utilized unbiased as a variable resistor and modulates the carrier frequency signal from oscillator 172 in accordance with the DC input signal from function generator 138. The output from modulator 170 is supplied to a feedback controlled sine power amplifier 174 and through the contacts of a SIN relay to sine winding 68. A feedback circuit is provided through a rectifier 176 to summing junction 166 which compares the output from sine function generator 138 with the rectified output from sine power amplifier 174 to insure that the output of power amplifier 174 is proportional to the output signal $v_s$ from function generator 138. is a minimum. Several of the carrier frequency signals sine teeth 10, 22 and 34 at the illustrated The means shown in dotted lines in FIG. 11 for deriving the signal $V_c$ in accordance with the x rectangular coordinate of a curve of FIG. 21 and which energizes cosine winding 70 does not generate $V_c$ directly in the preferred embodiment of the invention. Rather a function generator 178, termed voltage tachometer, is provided which derives a DC voltage $vt_s'$ that varies with speed in s, with the radius vector polar coordinate of a curve of FIG. 21, and thus in accordance with the desired angle sensor output signal characteristic designated $VT_s$ in FIGS. 8 and 11. Another way of stating this is that voltage tachometer 178 generates a DC signal which varies with motor speed as a function of $\sqrt{V_s^2+V_c^2}$. The DC output signal $vt_s'$ from voltage tachometer 178 is proportional to, but differs in magnitude from, the alternating angle sensor carrier frequency output voltage $vt_s$ and its modulation envelope $VT_s$, and all three are represented by the same characteristic in FIG. 11. Angle sensor control 76 vectorially subtracts the sine signal $V_s$ from the output signal $vt_s'$ from voltage tachometer 178 (which is proportional to $\sqrt{V_s^2+V_c^2}$) to derive the signal $V_c$ applied to cosine winding 70. Voltage tachometer 178 generates a different direct current signal $vt_s'$ for each power pedal position whose magnitude is proportional to the radius vector polar coordinate VT of a curve of FIG. 21 for such power pedal position. Thus voltage tachometer 178 generates a family of DC signal $vt_s'$ versus speed curves shown schematically in FIG. 12 whose magnitude is proportional to the required input $VT_s$ to cycloconverter which will provide the desired motor terminal voltage VT. These $VT_s$ versus speed characteristics for rated power and 50 percent power are shown in full and dotted lines respectively in FIG. 11, and the former is also shown in FIG. 8. Voltage tachometer 178 is shown in FIG. 13 but not described herein, and reference is made to parent application Ser. No. 824,223 for disclosure.

Figure 12:
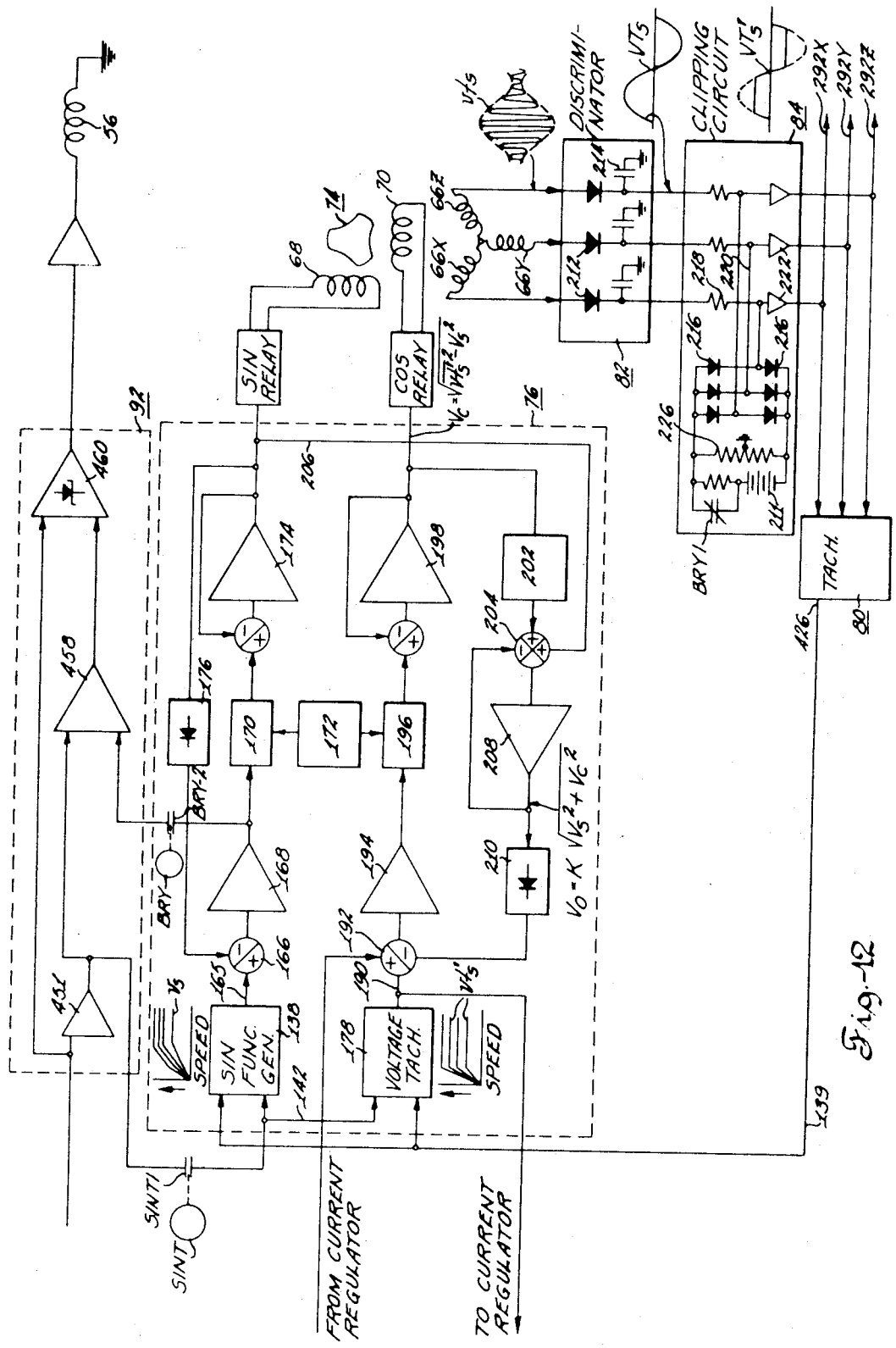
FIG. 12 is a schematic diagram in block form of the angle sensor control, the discriminator, and the clipping circuit.

Voltage tachometer 178 shown in FIGS. 12 and 13 receives a "power" signal on conductor 142 which is a function of the position of power pedal 44 and also receives a "speed" signal over conductor 139 which is a function of motor speed and modifies the power signal so the DC output $vt_s'$ from voltage tachometer 178 varies linearly from zero at zero frequency to full value at speed F=1.0 and remains at full value from F=1.0 to maximum motor speed. Stated in another way, for each power pedal position the DC signal $vt_s'$ varies with motor speed as a function of the desired magnitude VT of terminal voltage to be applied to stator winding 54 as shown in FIGS. 8 and 21, and all of the $vt_s'$ versus speed curves shown in FIG. 12 are of the same shape but have different magnitudes dependent upon the position of power pedal 44. Each of the $vt_s'$ versus speed characteristics schematically shown in FIG. 12 is associated with a different position of power pedal 44 and thus represents a different power level from electric drive 22.

The DC output signal $vt_s'$ from function generator 178 is supplied over conductor 190 (see FIG. 12) to a summing junction 192 where it is compared to a rectified DC voltage $V_c$ corresponding to the vector sum of the alternating voltages $V_s$ and $V_c$ on the sine and cosine windings 68 and 70. The difference signal from summing junction 192 is proportional to the x rectangular coordinate of a curve of FIG. 21 and is coupled through an operational amplifier 194 to a modulator 196 which preferably is a field effect transistor used unbiased as a variable resistor and receives a carrier frequency signal from oscillator 172 and modulates it in accordance with the DC output signal from operational amplifier 194. The alternating signal from modulator 196 is amplified in a cosine power amplifier 198, and the alternating output signal $V_c$ from power amplifier 198 is coupled through a COS relay to cosine winding 70. The signal $V_c$ is also fed back to summing junction 192 through phase shifting means 202 which shifts the phase of the alternating $V_c$ voltage applied to cosine winding 70 through 90° to provide the required right angle vectorial relationship between $V_s$ and $V_c$. The summing junction 204 vectorially adds the output signal $V_c$ from phase shifting means 202 with the sine signal $V_s$ on conductor 206 connected to the output of sine power amplifier 174. The difference output signal $V_c$ from summing junction 204 is proportional to $\sqrt{V_s^2+V_c^2}$ and is coupled through a feedback controlled amplifier 208 and a rectifier 210 to summing junction 192 which vectorially subtracts the rectified signal $V_c$ from the signal $vt_s'$ to derive the DC signal in accordance with the x rectangular coordinate of a curve of FIG. 21, and thus generate the alternating cosine signal $V_c$ equals $\sqrt{vt_s'^2-V_s^2}$ that is supplied to cosine winding 70. It will be appreciated that the disclosed circuit provides a closed loop in which the DC signal $vt_s'$ from voltage tachometer 178 is directly proportional to the vector sum of the alternating signals $V_s$ and $V_c$ applied to the sine and cosine windings. Thus, for a programmed input to voltage tachometer 178, the excitation of cosine winding 70 is forced to assume a value $V_c$ such that, when added vectorially to the excitation of sine winding 68, an output signal $VT_s$ (shown in FIGS. 8 and 11) will be derived form angle sensor secondary winding 66 which is in accordance with the radius vector polar coordinate of a curve of FIG. 21 and will result in the desired magnitude VT and phase DT of terminal voltage on motor stator winding 54 which will assure that the magnetic poles generated in motor rotor 52 are locked in with the rotating stator winding poles over the speed range.

FIG. 11 illustrates the signals $V_s$ and $V_c$ generated by angle sensor control 76 and the resulting signal $VT_s$ from angle sensor 64 over one-third of the motor speed range for 100 percent power, i.e., for a power signal from protection and regulation circuit 78 corresponding to the position of power pedal 44 calling for maximum power. The signals $V_s$, $V_c$ and $VT_s$ appear at the sine winding 68, the cosine winding 70 and at the angle sensor output winding 66 respectively (remembering that $VT_s$ is the modulation envelope of the voltage which is demodulated in discriminator 82 and limited in clipping circuit 84). The displacement angle of the rotary inductor, vector adder output voltage $VT_s$ over this speed range and the actual voltage applied by cycloconverter 58 to motor stator winding 54 are designated $DT_s$ and VT respectively in FIG. 11.

Over the speed range from zero to speed equals approximately 1.0, the sine signal $V_s$, the output signal $VT_s$ from angle sensor 64 which controls cycloconverter 58, and the motor terminal voltage VT increase linearly with motor speed, and the voltage $V_c$ applied to cosine winding must also increase linearly with speed so that the displacement angle $DT_s$ (which is equal to the tangent of the angle between $V_c$ and $VT_s$) shown in FIG. 11 remains constant at approximately 40°.

Above speed F=1.0 angle sensor control 76 regulates angle sensor 64 to generate a constant magnitude output signal $VT_s$ (which controls cycloconverter 58) as shown in FIGS. 8 and 11 by unequally varying the magnitudes of signals $V_c$ and $V_s$ in opposite directions as a function of motor speed to obtain the required displacement angle $DT_s$. It will be noted from FIG. 11 that cosine signal $V_c$ starts to decrease at speed F=1.0, that sine signal $V_s$ continues to increase above this speed, that the output signal $VT_s$ from angle sensor 64 is constant in magnitude above this speed, and that the displacement angle $DT_s$ continues to increase to a maximum value of s, at approximately speed F=3.5. Above this speed the magnitude of sine signal $V_s$ is constant and the cosine signal $V_c$ is zero. It will be recalled that a different curve of the shape shown in FIG. 21 graphically expresses the relationship between motor speed F, terminal voltage VT and phase angle DT for each position of power pedal 44 and further that cosine signal $V_c$ is derived by vectorially subtracting sine signal $V_s$ from voltage tachometer output signal $vt_s'$ which is proportional to angle sensor output signal $VT_s$, whereby $V_d$ is forced to diminish when $vt_s'$ remains constant above speed 1.0 and $V_s$ increases in magnitude above this speed.

Demodulator

The carrier frequency is removed from the low frequency, modulation envelope output signals $VT_s$ from angle sensor secondary phase windings 66X, 66Y and 66Z in a ring type discriminator, or demodulator 82 which may be of conventional construction and is shown schematically in FIG. 12 as including rectifiers 212 and filter capacitors 214. The carrier frequency angle sensor output signals $vt_s$ is converted by discriminator 82 to the low frequency sinusoidal signal $VT_s$ which is in accordance with the envelope of the carrier frequency input signals $vt_s$ to the discriminator. A single phase of the sinusoidally modulated carrier frequency input signal $vt_s$ to and also of the low frequency output signal $VT_s$ from discriminator 82 is shown in FIG. 12, and it will be appreciated that alternate half waves of the envelope are eliminated by rectifier action in the discriminator.

Clipping Circuit

The peak portions of the output signals $VT_s$ from demodulator 82 are removed, or clipped in clipping circuit 84 which provides a generally trapezoidal output signal $VT_s'$ and is schematically shown in FIG. 12 to include a reverse bias voltage source 211 which applies potentials of opposite polarity to the ends of diode bridge having three branches each comprising a pair of serially connected diodes 216. The anodes of three diodes 216 which clip the positive peaks are connected to the positive side of voltage source 211, while the cathodes of the three remaining diodes 216 which clip the negative peaks are connected to the negative side of source 211.

The phase X, Y and Z input signals $VT_s$ to clipping circuit 84 from discriminator 82 flow through current limiting resistors 218 and conductors 220 to the junction points of the serially connected diodes 216 in the three branches of the diode bridge. When the voltage of the input signals $VT_s$ exceed the reverse bias provided by voltage source 211, the diodes 216 conduct to clip the peak portions of the signals and thus derive the trapezoidal output voltages $VT_s'$.

The voltages $VT_s'$ from clipping circuit 84 are supplied to firing circuit 60 through power amplifiers 222 which match the high output impedance of the discriminator 82 with the low input impedance of firing circuit 60. During driving of the vehicle, clipping circuit 84 preferably clips the signals $VT_s$ from discriminator 82 at half their peak value which corresponds to the most advanced firing angle of the SCR's in cycloconverter 58 as hereinafter described. During braking of the vehicle, relay contacts BRY1 are opened and insert a resistance 225 between voltage source 211 and the diode bridge, thereby decreasing the reverse bias on the diodes 216 and reducing the point of clipping to approximately 0.2 of the peak value of the output signals $VT_s$ from discriminator 82. Such change in clipping level limits the power returned by motor 50 to generator 30 and engine 20 to that which the engine 20 can absorb.

Cycloconverter

Cycloconverter 58 converts the three-phase, high and constant frequency voltages A, B and C from generator 30 on busses 38A, 38B and 38C into three-phase, variable and relatively low frequency voltages VT for energizing motor stator phase windings 54X, 54Y and 54Z over motor terminal leads L1, L2, and L3 (see FIG. 14).

Cycloconverter 58 preferably includes 18 thyristors, or controlled rectifiers arranged so that six thyristors are interconnected as a thyristor "set" to supply power to each of the wye-connected stator phase windings 54X, 54Y and 54Z. Cycloconverter 58 comprises three such thyristor sets 226X, 226Y and 226Z of six thyristors which respectively supply power over motor terminal leads L1, L2 and L3 to the stator phase windings 54X, 54Y and 54Z, and only thyristor set 226X which supplies power over motor terminal lead L1 will be described, the other sets 226Y and 226Z being similar thereto. Thyristor set 226X includes three thyristors 230, 232, and 234, termed the positive group, which allow only positive current to flow into motor stator winding 54X and three thyristors 231, 233 and 235 called the negative group, which supply current in the negative direction to motor stator winding 54X. The thyristors 230, 232, and 234 of the positive group have their anodes connected to the power busses 38A, 38B and 38C respectively and their cathodes connected to one end X2 of a center-tapped reactor XL1. The thyristors 231, 233 and 235 of the negative group have their cathodes connected to the power busses 38A, 38B and 38C respectively and their anodes commoned and connected to the other end X1 of reactor XL1. The center tap 238 of reactor XL1 is connected to motor terminal lead L1 which supplies power to stator phase winding 54X.

The thyristors 230—235 are turned on, or "fired", to the conductive state sequentially by "gate" signals from firing circuit 60 for approximately 120 electrical degrees of the voltages A, B and C from generator 30, and firing circuit 60 supplies gating signals for the thyristors of the positive group and the negative group in accordance with the phase sequence of the generator voltages A, B and C.

Firing circuit 60 generates gating signals to thyristors 230-—235 in response to the low frequency output signals $VT_s$ from angle sensor 64 so as to cyclically supply current to motor stator windings 54X, 54Y and 54Z for greater or lesser portions of each cycle of the high frequency generator voltages A, B and C, thereby providing a variable low frequency output voltage VT from cycloconverter 58 which is a function of the control signal $VT_s$ from angle sensor 64. Firing circuit 60 derives gating signals which control the turn-on interval of thyristors 231—235 so that the average value of cycloconverter output voltage on either the positive group (at terminal X2 with reference to the generator neutral) or the negative group (at terminal X1 with reference to the generator neutral) can assume a controlled amplitude of either positive or negative polarity and which is a function of angle sensor output voltage $VT_s$ in magnitude, polarity and phase angle. Firing circuit 60 provides gating signals which fire both positive and negative groups simultaneously so that said positive and negative groups of thyristors produce identical average voltages on reactor terminals X1 and X2, and thus allow the current to change from the positive to the negative group and vice versa, whereby phase shift of the motor current in either the leading or lagging direction with respect to the motor internal voltage $E_D$ (which is proportional to field winding current) is possible as required by the reactor motor load.

When controlled rectifier 230 or 231 is conducting, thyristor set 226X is connected in series with generator phase winding 30A and motor stator winding 54X.

Operation of Cycloconverter

The controlled rectifiers, which preferably are SCR's, only conduct when their cathodes are negative with respect to their anodes and, in addition, firing signals are applied to their gates. The voltage wave forms in FIG. 15 illustrate frequency conversion to produce a sinusoidal voltage VT on motor line lead L1.

The generator frequency "reference" input voltages on conductors 290A, 290B and 290C (see FIG. 14) to firing circuit 60 derived by filter 86 are proportional to and in phase with the generator voltages A, B and C, and such reference voltages are hereinafter referred to by these same designations, i.e., A, B, and C, in order to facilitate the understanding of the invention.

Figure 15A:
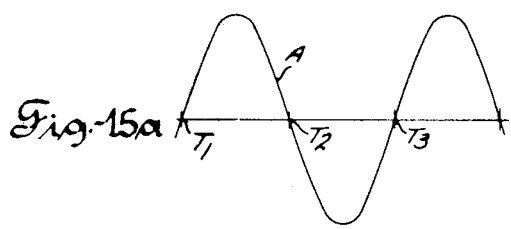
Figure 15B:
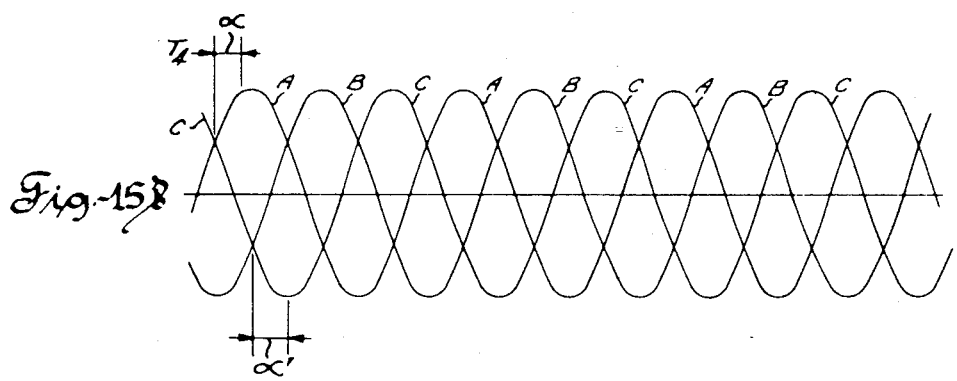

Controlled rectifier 230 of the positive group has its anode connected to power bus 38A and its cathode connected to terminal X2 and may conduct, if fired by a signal from firing circuit 60 applied to its gate, at any time when its anode is more positive than its cathode, for example, between times T1 and T2 as shown in the FIG. 15a representation of a single phase voltage A applied across its anode and cathode. Similarly SCR 231 of the negative group has its cathode connected to power bus 38A and its anode connected to reactor terminal X1 and may conduct, if fired by a signal from firing circuit 60 applied to its gate, between times T2 and T3 during the negative half cycle of single phase voltage A shown in FIG. 15a. In the three phase cycloconverter 58, the point in the cycle of reference voltage A at which a firing signal is applied to the gate of SCR 230 of the positive group to render it conductive may be defined in terms of the number of electrical degrees, termed the firing angle $\alpha$ (shown in FIG. 15b for the positive group) subsequent to time T4 at which the negative-going voltage C and the succeeding phase positive-going voltage A cross. Such firing angle $\alpha$ may be reduced by applying the gating signal closer to time T4 so that a greater portion of the positive half cycle generator voltage A from bus 38A is applied to motor stator winding 54X, or conversely the firing may be retarded by applying the gate signal to SCR 230 closer to time T2 so that a smaller portion of the positive half cycle of generator voltage A is supplied to stator winding 54X. The firing angle $\alpha'$ for the negative group is also shown in FIG. 15b.

Figure 15C:
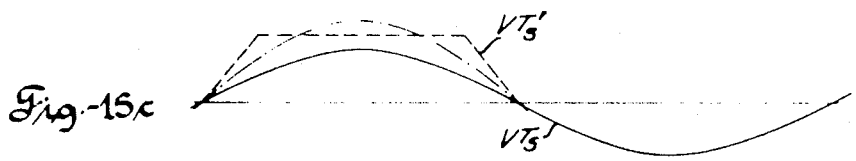
Figure 15D:
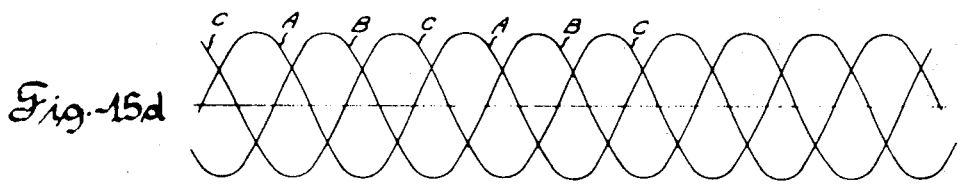

Since thyristor set 226X includes a pair of oppositely poled thyristors connected to each power phase bus 38A, 38B and 38C, the thyristors must be fired in the proper sequence as well as during the proper portion of the cycle. FIG. 15d illustrates the three phase-to-neutral reference voltages A, B and C (derived by filter 86 from the corresponding generator voltages) when the phase sequence is A, B, C. The sequence of firing in the positive group is first SCR 230, then SCR 232, and finally SCR 234 to sequentially conduct portions of the positive half cycles of generator voltages A, B and C, and similarly the sequence of firing in the negative group is SCR 231, then SCR 233 and finally SCR 235 to conduct during the negative half cycles of the generator voltages A, B and C.

Sequence Signals

Firing circuit 60 superimposes the low frequency output signals $VT_s'$ from clipping circuit 84 (see FIGS. 12 and 15c) on the three phase reference voltages A, B, and C (see FIG. 15d) from filter 86 to derive "sequence" signals $A+VT_s, B+VT_s$ and $C+VT_s$ (see FIG. 15e) which control the gating of SCR's 231—235. FIG. 15c illustrates the low frequency output signal $VT_s'$ from clipping circuit 84 which is a replica of the voltage VT desired at the terminals of motor stator winding 54. The clipping circuit output voltage $VT_s'$ is sinusoidal as shown in full lines when the motor is to be supplied with a terminal voltage VT smaller than rated voltage. For rated voltages, clipping circuit 84 provides the trapezoidal waveform $VT_s'$ shown in dashed lines in FIG. 15c (the dash-dot line represents the fundamental component of the trapezoidal wave which is seen by the motor 54). High frequency harmonics of the trapezoidal wave have little effect on performance of motor 50 because of the high inductive reactance of stator winding 54 at such frequency. It will be appreciated that the clipping permits the voltage of generator 30 and the voltage rating of the SCR's in cycloconverter 58 to be substantially reduced.

Firing circuit 60 superimposes the clipping circuit output voltage $VT_s'$ shown in FIG. 15c on the three phase reference voltages A, B, and C shown in FIG. 15d to derive the three sequence signals $A+VT_s, B+VT_s$ and $C+VT_s$ shown in FIG. 15e. As explained hereinafter, firing circuit 60 includes crossing detectors which sense the zero crossing points of the sequence signals to generate the gating signals for the controlled rectifiers. Sequence signal $B+VT_s$ controls gating of SCR's 230 and 231; sequence signal $C+VT_s$ controls gating of SCR's 232 and 233; and sequence signal $A+VT_s$ controls gating of SCR's 234 and 235. When a sequence signal goes through zero in a positive-going direction, firing circuit 60 provides a gating signal to an SCR in the positive group, and when it goes through zero in the negative-going direction, firing circuit 60 provides a gating signal to an SCR in the negative group. For example, at time T10 shown in FIG. 15e sequence signal $B+VT_s$ goes through zero in a positive-going direction; and firing circuit 60 generates a firing signal 240, which is applied to the gate of SCR 230, thereby causing it to conduct and connect generator voltage A from power bus 38A to motor terminal lead L1. The dotted squares above the zero line in FIG. 15e represent the gate signals, or on-times, for the SCR's of the positive group, and the dotted squares below the zero line represent the gate signals for the SCR's of the negative group. The reference numerals on the right of FIG. 15e represent the corresponding thyristors which are fired by the individual firing signals.

At time T11 sequence signal $C+VT_s$ goes through zero in a positive-going direction, and firing circuit 60 derives gating signal 242 which fires SCR 232 to connect voltage B in bus 38B to terminal X2 and motor stator winding 54X. At time T12 sequence signal $A+VT_s$ goes through zero in a positive-going direction, and firing circuit 60 derives gating signal 244 which fires SCR 234 to connect voltage C in power bus 38C to reactor terminal X2 and motor stator winding. At times T13, T14, and T15 the sequence signals $C+VT_s, A+VT_s$ and $B+VT_s$ respectively go through zero in a negative-going direction, thereby causing firing circuit 60 to derive gating signals 246, 248 and 250 respectively which fire SCR's 233, 235 and 231 which conduct to connect the generator voltages B, C and A to terminal X1 and motor stator winding 54X.

Whenever a sequence signal, such as $C+VT_s$ passes from the negative to the positive voltage level, such as at time T11, firing circuit 60 generates a gating signal 242 for gating SCR 232 of the positive group and it also interrupts the gate signal such as 240 of the SCR 230 which was previously on. Similarly when a sequence signal such as $A+VT_s$ goes from the positive to the negative voltage level, such as at time T14, firing circuit 60 derives a gating signal 248 for turning SCR 235 on and also interrupts the gating signal 246 of SCR 233 which was previously on.

It will be noted that the sequence signal, such as A+VT$_s$ which results from adding generator phase voltage A and angle sensor output voltage VT$_s$ controls firing of SCR's 234 and 235 connected to bus 38C in which phase voltage C appears, and thus permits shifting of the firing angle $\alpha$ within the range of 0° to 180°.

The instantaneous output voltages from cycloconverter 58 can be determined by projecting the firing signals downward on the generator voltages A, B and C as shown in FIGS. 15$f$ and 15$g$. FIG. 15$f$ illustrates the instantaneous voltages at terminal X2 which is connected to the common point of the SCR's of the positive group, and FIG. 15$g$ illustrates the instantaneous voltage at terminal X1 which is connected to the common point of the SCR's of the negative group. A thyristor 230, 232 or 234 which is fired in the positive group will allow the generator voltage to appear on terminal X2, while thyristor 231, 233 or 235 which is fired in the negative group imposes the generator voltage on terminal X1. The heavy lines in FIGS. 15$f$ and 15$g$ show the instantaneous voltages which appear at terminals X2 and X1 respectively when the corresponding thyristors are fired. For example, at time T13 when firing circuit 60 derives gating signal 246 and SCR 233 conducts, the portion of generator voltage B designated 252 in FIG. 15$g$ appears at terminal X1; at time T10 when firing circuit 60 derives gating signal 240 and SCR 230 conducts, the portion of generator voltage A designated 254 in FIG. 15$f$ appears on terminal X2; at time T11 when firing circuit 60 derives gating signal 242 and SCR 232 conducts, the portion of generator voltage B designated 256 in FIG. 15$f$ appears at terminal X2.

The inductance of motor stator winding 54 results in an SCR such as 230 continuing to conduct (due to Lenz's law) below the zero axis, as shown at 258 in FIG. 15$f$, even though the generator phase voltage is negative with respect to the generator neutral potential, and it will be appreciated that for a pure resistive load such condition would "commutate" SCR 230 off.

The sinusoidal dashed line curves VT in FIGS. 15$f$ and 15$g$ represent the average voltages of the clipped waveforms shown in solid lines, and it will be noted that identical output waves VT are obtained at terminals X1 and X2. It will be appreciated that the waveforms shown in FIGS. 15$f$ and 15$g$ should actually be superimposed since the positive and negative groups of SCR's are connected to the same generator terminals, and the waveforms are shown separately in FIGS. 15$f$ and 15$g$ to facilitate understanding of the waveforms.

Although the average voltages VT shown in dashed lines in FIGS. 15$f$ and 15$g$ appearing at terminals X1 and X2 are equal, their instantaneous voltages at these terminals are not equal, and the differential voltage of terminal X1 with respect to terminal X2 is shown in FIG. 15$h$. The center-tapped reactor XL1 appears as an inductive choke to the high frequency exchange current and limits the exchange current between terminals X1 and X2 to that shown in dashed lines in FIG. 15$h$. Although motor stator winding 54 does not receive a smooth sinusoidal voltage VT, the motor current is fairly sinusoidal because the high inductance of motor stator winding 54 produces filter action.

Filter

When switching occurs in a current carrying thyristor group such as the positive group of SCR's 230, 232 and 234, the load current is transferred from the SCR such as 232, which was on, to the succeeding SCR such as 234 which just received its gate signal from firing circuit 60. Such current transition, termed commutation, in effect causes two generator phases to be shorted at terminal X2 and results in commutation notches in the generator voltage such as schematically shown at 260 in FIG. 14, which notches are of square wave nature and are superimposed in the sinusoidal voltages A, B and C from generator 30. Such commutation notches can either aid or reduce the effective motor terminal voltage VT applied to stator winding 54, and filter 86 eliminates such notches and reproduces the fundamental wave of the distorted generated voltages A, B and C and derives the "reference" voltages (given the same designation numbers in this drawing as the corresponding generator voltages) which are superimposed on the angle sensor output voltages VT$_s$ in firing circuit 60.

FIG. 14 schematically illustrates only the elements necessary for filtering one generator phase voltage A. The generator voltages A, B and C from busses 38A, 38B and 38C are coupled to filter 86 through an input transformer 262 which steps down the voltage and isolates the filter from generator noise in busses 38A, 38B and 38C. The signals from the secondary winding of transformer 262 pass through a filter section comprising a resistor 264 and a capacitor 266 which removes the gross discontinuities in the generator voltages but leaves considerable harmonic distortion in the output voltage 268 therefrom.

The output signals 268 from the resistive-capacitive filter section are passed successively through a clipping regulator 270 and a pi-filter section 272. Clipping regulator 270 removes the positive and negative peaks of signals 268 and may include a pair of oppositely biased PNP and NPN transistors 274 and 276 connected in emitter-follower configuration. The signals 268 containing harmonic distortion are applied to the bases of transistors 274 and 276 so that the positive and negative cycles alternately drive the transistors into saturation at a level determined by the collector bias (not shown). Saturation of transistors 274 and 276 clips the peak portion of the signals, and the voltage regulation accomplished by such clipping is necessary to assure that the reference voltages A, B and C applied to the firing circuit 60 are of approximately constant r.m.s. valve even if the magnitude of the generator voltages A, B and C should vary over a wide range. This assures that the sequence signals A+VT$_s$,B +VT$_s$ and C+VT$_s$ derive firing signals of the proper sequence and that no phase shift occurs in the points at which the firing signals such as 240 and 242 are derived, thereby assuring that no change occurs in cycloconverter output voltage VT to the motor winding. Transistors 274 and 276 also form a buffer amplifier having a low output impedance which matches the input impedance of the RC filter section 272.

The output voltages 278 from the clipping regulator 270 are generally trapezoidal. Final pi-filter 272 comprised of a choke 280 and capacitors 282 retrieves the fundamental voltage A from trapezoidal signal 278. This fundamental signal A corresponds to the generator voltage A in bus 38A without the notches 260 and is regulated and reduce in magnitude and is shifted only slightly in phase and comprises the reference signal A which is superimposed on the angle sensor output signal VT$_s$ in firing circuit 60.

The r.m.s. value of the fundamental voltage A derived from trapezoidal signal 278 in final pi-filter 272 varies only slightly in value even with substantial variations in peak value of the sinusoidal generator voltage, and consequently changes in generator output voltage have minimal effect on the points at which firing signals such as 240, 242 and 244 (see FIG. 15$e$) are derived in firing circuit 60.

Firing Circuit

Firing circuit 60 includes three firing signal generators FGX, FGY and FGZ (see FIG. 14) each of which derives the gating signals for one of the thyristor sets 226X, 226Y and 226Z, and only firing signal generator FGX associated with thyristor set 226X which supplies current to motor stator winding 54X will be described. FIG. 17$a$ shows firing signal generator FGX in detail and firing signal generators FGY and FGZ in block form. Firing signal generator FGX is associated with motor terminal lead L1 and motor stator phase winding 54X and preferably includes three similar crossing detectors CD1, CD2 and CD3, each of which is associated with one of the generator phase voltages A, B or C, six logic elements FF1—FF6, termed flip-flops, each of which controls gating of one controlled rectifier 230—235 of thyristor set 226X, and six inverters, or oscillators INV1—INV6 controlled by the flip-flops. Firing signal generator FGX provides firing signals 240, 242, 244, 246, 248 and 250 (see FIG. 15$e$) to the six controlled rectifiers 230, 232, 234, 233, 235 and 231 respectively of thyristor set 226X.

Only crossing detector CD1 will be described which generates firing signals 240 and 250 to controlled rectifiers 230 and 231 which connect generator voltage A in bus 38A to motor stator winding 54X. The reference voltage B from filter 86 (see FIG. 14) appearing in conductor 290B is supplied to crossing detector CD1 in order to form the sequence signal B+VT$_s$ which controls generation of firing signals 240 and 250. The low frequency output signal VT$_s$ from angle sensor secondary winding 66X, after demodulation and clipping, appearing in conductor 292X (see FIGS. 12 and 14 and designated VT$_s'$ in FIG. 12) and the reference voltage B in conductor 290B from filter 86 are superimposed at junction 293 to form sequence signal B+VT$_s$ shown in FIG. 15$e$ and again in FIG. 17$b$. The sequence signal B+VT$_s$ generated at junction 293 is clipped at the forward voltage drop of a pair of oppositely poled diodes 294 to derive a trapezoidal signal 296 shown in FIG. 17$c$ which prevents excessive voltages from being applied to the remainder of the circuit.

Crossing Detector

Crossing detector CD1 (see FIG. 17) detects both positive-going and negative-going zero crossings of sequence signal B+VT$_s$ and includes a pair of emitter-coupled transistors 297 and 298. The emitter-collector circuits of transistors 297 and 298 are connected through resistors 300 and 302 respectively to a conductor 306 from one side +V of a biasing voltage source, and the emitters of the two transistors 297 and 298 are commoned and connected through a resistor 304 to a conductor 308 from the other side V— of the biasing voltage source. The base of transistor 297 is connected through a resistor 310 to junction 293, while the base of transistor 298 is connected to ground through a resistance 311. When transistor 297 is conducting, transistor 298 is turned off by the bias applied to its emitter by the voltage drop across resistor 304. Similarly transistor 297 is biased to a nonconductive state when transistor 298 is conducting. Crossing detector CD1 is analogous to a bistable Schmitt trigger circuit in that once it is triggered into one state by a signal of one polarity, for example, a positive 0.2 volt signal, its trip level is changed and the input signal must decrease to some value appreciably below 0.2 volts to trigger it to the opposite state. Such "differential input" network comprised of transistors 297 and 298 provides temperature compensation and stability to crossing detector CD1.

When sequence signal B+VT$_s$ crosses zero in a positive-going direction, transistor 297 is rendered conductive by the positive signal applied to its base. The collector of transistor 297 is connected to the base of a transistor 312, and the change in potential at the collector of transistor 297 when it conducts turns on transistor 312. The emitter-collector circuit of transistor 312 is connected in series with a voltage divider including resistors 314 and 316 across the source of bias voltage on conductors 306 and 308. When transistor 312 is turned on, a positive voltage appears on its collector. This positive voltage is fed through a resistor 318 and a capacitor 320 to the base of transistor 297 and acts as a regenerative feedback signal which changes the trip level of the crossing detector and insures the rapid turn-on and saturation of transistor 297. The positive voltage at the collector of transistor 312 drives the voltage at junction 322 between resistors 314 and 316 positive and generates the square wave output signal 324 shown in FIG. 17$d$. The rectangular pulse 324 is applied to a differentiating circuit including a capacitor 326 and a resistor 328 to form a spike pulse 330 shown in FIG. 17$e$ which is supplied over conductor 331 to the set terminal of a flip-flop FF1.

When sequence signal B+VT$_s$ crosses zero in a negative-going direction, transistor 297 is turned off by the negative portion of trapezoidal signal 296 applied to its base. The resulting increase in potential at the collector of transistor 297 turns off transistor 312, thereby causing the negative voltage in conductor 308 to appear at the collector of transistor 312 and at junction 322. The negative voltage at the collector of transistor 312 is coupled through resistor 318 and capacitor 320 to the base of transistor 297 and is a degenerative feedback signal which restores the crossing detector to its original trip level and insures the turning off of transistor 297.

Turning off of transistor 297 removes the bias from the emitter of transistor 298 and turns transistor 298 on. The collector of transistor 298 is connected to the base of a transistor 332, and the change in voltage at the collector of transistor 298 turns on transistor 332 and provides a positive rectangular voltage pulse 334 at junction 336 as shown in FIG. 17$f$. This rectangular voltage pulse is applied to a differentiating circuit formed by a capacitor 338 and a resistance 340 to generate a spike pulse 342 shown in FIG. 17$g$ which is supplied over conductor 344 to the set input of a flip-flop FF2.

When transistor 297 is again rendered conductive by a positive-going zero crossing of sequence signal B+VT$_s$, transistor 298 is turned off, thereby turning off transistor 332. The negative spike generated by the differentiating circuit including capacitor 338 and resistor 340 is shorted to ground through a diode 346.

Flip-flops FF1 and FF2 are preferably conventional bistable flip-flops which provide a signal at an output terminal in response to a signal to the "set" terminal and remove the output signal in response to a signal applied to its "reset" terminal and may be of the type sold by Motorola, Inc. under the designation MC-302.

Ring Counter

Flip-flops FF1, FF3 and FF5 in firing signal generator FGX have their set and reset inputs interconnected as a three element ring counter so that a set signal to one flip-flop, for example, a spike pulse 330 on conductor 331 to flip-flop FF1, provides an output signal 348 therefrom shown in FIG. 17$h$, and this same spike pulse 330 is also applied over conductor 350 as a reset signal to a flip-flop FF5 presently providing an output signal so as to remove the output signal therefrom. Flip-flop FF1 is reset by a signal over conductor 352 when crossing detector CD2 detects a zero crossing of the voltage signal C+VT$_s$ (similar to FIG. 15$e$) and generates an input set pulse to flip-flop FF3. The set and reset input terminals of the flip-flops FF1, FF3 and FF5 are interconnected as a ring counter so that their operation proceeds in a continually repetitive, or endless manner, and flip-flops FF2, FF4 and FF6 are similarly interconnected as a three element ring counter.

Flip-flops FF1, FF2, FF3, FF4, FF5 and FF6 initiate the firing signals 240, 250, 242, 246, 244 and 248, respectively for SCR's 230, 231, 232, 233, 234 and 235, and the three element ring counters formed by these flip-flops also terminate the firing signals. For example, the spike pulse 330 on conductor 331 to set flip-flop FF1 and thus generate firing signal 240 is also applied over conductor 350 to the reset terminal of flip-flop FF5 to turn off firing signal 244. Similarly the spike pulse 342 on conductor 344 to set flip-flop FF2 and thereby generate firing signal 250 is also applied over conductor 354 to the reset terminal of flip-flop FF6 and results in termination of firing signal 248.

Inverter

The output terminals of flip-flops FF1 and FF2 are connected to free running astable saturating-core oscillators, or inverters INV1 and INV2 (see FIG. 17$a$) respectively. An output signal 348 (see FIG. 17$h$) from a flip-flop such as FF1 turns on the corresponding oscillator INV1 so that it oscillates to provide output pulses which form firing signal 240 and maintains it on until the flip-flop FF1 is reset to remove the output signal. Oscillators INV1 and INV2 are shown in FIG. 17 but not described herein, and reference is made to our parent application, Ser. No. 824,223 for a detailed description.

Inverter INV1 continues to oscillate as long as an output signal is supplied by flip-flop FF1, i.e., until a reset signal is supplied to flip-flop FF1. Referring to FIG. 15$e$, it will be noted that the termination of firing signal 240 to SCR 230 coincides with the generation of firing signal 242 to SCR 232 at time T11. Firing signal 240 is terminated by the interconnection of the set and reset inputs of flip-flops FF1 and FF3 wherein the set signal to flip-flop FF3 turns on inverter INV3 to generate firing signal 242 for controlled rectifier 232 at time T11 and this same signal is also applied to the reset terminal of flip-flop FF1 over conductor 352, thereby removing the output signal of flip-flop FF1 and turning off transistor 364 and terminating the operation of oscillator INV1.

Oscillator INV2 operates in a similar manner in response to an output signal from flip-flop FF2 when sequence signal B+VT$_s$ crosses zero in a negative-going direction and turns off transistor 297 and turns on transistors 298 and 332 to derive the set signal 342 to flip-flop FF2. In response to the output signal from flip-flop FF2, inverter INV2 generates firing signal 250 shown in FIGS. 15e and 17j which turns on SCR 231. Firing signal 242 is terminated by the generation of firing signal 244 by crossing detector CD3, flip-flop FF5 and inverter INV5 since the input signal to the set terminal of flip-flop FF5 from crossing detector CD3 is also supplied over conductor 402 to the reset terminal of flip-flop FF3.

The relationship between the SCR firing signals, the sequence signals which control them, and the circuits which generate them is shown in the following table:

| Sequence signal | Firing signal | SCR | Flip-flop | Crossing detector | Inverter |
|---|---|---|---|---|---|
| B plus VT$_s$ | 240 | 230 | FF1 | CD1 | INV1 |
|  | 250 | 231 | FF2 | CD1 | INV2 |
| C plus VT$_s$ | 242 | 232 | FF3 | CD2 | INV3 |
|  | 246 | 233 | FF4 | CD2 | INV4 |
| A plus VT$_s$ | 244 | 234 | FF5 | CD3 | INV5 |
|  | 248 | 235 | FF6 | CD3 | INV6 |

Tachometer

The three-phase signals VT$_s'$ (originally generated in angle sensor secondary windings 66X, 66Y and 66Z) appearing on conductors 292X, 292Y and 292Z at the output of clipping circuit 84 are coupled to tachometer, or pulser 80 which generate 36 pulses per revolution of motor rotor 52 at a frequency which is a function of motor speed and is the speed reference input to function generators 138 and 178 of angle sensor control 76. Tachometer 80 shown in FIG. 16 includes six crossing detectors, similar to those of firing circuit 60 hereinbefore described, with three crossing detectors CD10, CD11 and CD12 having one input terminal connected to receive a phase voltage and the other terminal grounded so that they detect zero crossings of the phase voltages in both the positive- and negative-going directions, and three crossing detectors CD13, CD14 and CD15 each having both input terminals connected to receive different phase-to-phase voltages so they detect crossings at different times than those to which detectors CD10, CD11 and CD12 respond.

When phase X voltage is greater than that of phase Y, transistor 410 (see FIG. 16) of crossing detector CD15 may be biased on by the voltage drop across one of a pair of oppositely poled diodes 412 and 414 connected to its base which constitute a clamping circuit so that the voltage at its base is above that at the base of a transistor 416. When phase X and phase Y voltages cross so that phase Y voltage becomes the greater, transistor 410 goes off. The change of potential at the collector of transistor 410 is coupled to the base of a transistor 417 to turn it off and provide a pulse through a diode 418 connected to its collector to common conductor 420. The output pulses appearing on common conductor 420 are coupled through transistors 422 and 424 in succession to output terminal 426. Since angle sensor secondary winding 66 is the equivalent of three pole-pairs, 36 crossings will occur for each revolution of angle sensor rotor 74, and the crossing detectors CD10 to CD15 will generate 36 pulses appearing at output terminal 426 at a frequency which is a function of motor speed and supplied over conductor 139 to sine tachometer 138 and voltage tachometer 178.

Driver-operated Apparatus

FIG. 18 utilizes the symbols = and ≠ conventionally used in wiring diagrams to designate pairs of normally open and normally closed contacts respectively. Foot power pedal 44 (see FIG. 18) is coupled to the movable contact of a potentiometer 430 connected between the positive side of a voltage source designated + and the grounded negative side designated − so that a "power" signal proportional to the desired power output of electric drive system 10 is derived at the potentiometer movable contact and coupled through an impedance matching amplifier 432 of master driver-operated control 48 to a subtraction amplifier 434 of protection and regulation circuit 78 (and also to similar subtraction amplifiers of electric drives 24, 26 and 28).

Foot brake pedal 46 is coupled to the movable contact of a potentiometer 436 connected between a brake reference circuit 438 and ground so that a "braking" signal corresponding to brake position is derived at the potentiometer movable contact and coupled through an impedance matching amplifier 440 of master control 48 to subtraction amplifier 434 (and also to similar subtraction amplifiers of electric drives 24, 26 and 28). Brake reference circuit 438 receives a controlling signal from power brake amplifier 432 so that if the power pedal 44 and brake pedal 46 are both fully depressed, the input signals to angle sensor control 76 and motor exciting coil control 92 will remain at the maximum value associated with motor speed above F=1.0. If foot power pedal 44 is kept fully depressed, the voltage from brake reference circuit 438 to brake potentiometer 436 is twice the voltage across power pedal potentiometer 430 and the power signal to subtraction amplifier 434 is partially wiped out as the brake pedal 46 is depressed, and the brake signal predominates over the power signal at the 50 percent brake pedal position and results in regenerative braking of motor 50 by increasing the reference signal to motor exciting coil control 92.

Subtraction amplifier 434 receives both the "power" signal and the "braking" signal as inputs and provides an output signal whose polarity is dependent upon which of the two input signals is the larger. The output signal from subtraction amplifier 434 is supplied to a brake sense circuit 442 which provides an output signal to tell relay logic circuit 88 to regeneratively brake motor 50 when the polarity of the signal from subtraction amplifier 434 indicates that the braking signal predominates over the power signal. The output signal from subtraction amplifier 434 is also the input to an absolute value operational amplifier 444 which is responsive to either polarity of input signal to provide a unidirectional output signal whose magnitude is proportional to the magnitude of the input signal thereto. The output from absolute value amplifier 444 is one input to a main summing amplifier 446 which also receives input signals from protective circuits such as the current limit circuit 448 and the overtemperature circuit 450 which modify the "power" signal input from absolute value amplifier 444.

The output signal from main summing amplifier 446 is supplied through an amplifier 451 and the contacts SINT1 of a SINT relay to function generators 138 and 178 of the angle sensor control 76 and also through amplifiers 458 and 460 of the exciting coil control circuit 92 which energizes field winding 56. When foot power pedal 44 is fully depressed, the output of main summing amplifier 446 will be such that a maximum power reference signal will be derived (if not modified by the current limit circuit or the braking signal).

When brake pedal 46 is fully depressed, the output of absolute value amplifier 444 is still proportional to the magnitude of its input signal, although reversed from the polarity when the "power" signal predominates, and the angle sensor output signal VT$_s$ and motor field reference signal again reach maximum values, but these signals are modified through switching circuits (specifically relay BRY explained hereinafter) so that maximum applied motor voltage VT and motor field current I$_f$ will not result in regenerative power beyond the absorption capability of diesel engine 20.

Travel Selection and Speed Limit

Manually operated travel direction and speed limit selector includes a handle DS which is moved to the right to drive the vehicle forward and to the left to reverse the vehicle and to operate limit switch contacts DSF and DSR respectively in the relay logic circuit 88. Selector handle DS is connected to the movable contact of a potentiometer 452 having a grounded center tap and with ends connected to the same polarity, i.e., positive, of the voltage source so that a "speed limit" signal derived at the movable contact has the same polarity regardless of where the direction selector DS is moved and its magnitude is proportional to the displacement of selector DS from the neutral position and sets a desired level of speed limit for the direction of travel selected. The speed limit signal is supplied through an impedance matching amplifier 454 to the speed limit circuit 456 of protection and regulation circuit 78 which also receives a speed signal input from tachometer 80 proportional to actual motor speed and compares the two signals and, if actual motor speed exceeds the speed limit, provides an error signal to subtraction amplifier 434 which is opposed to the "power" signal and decreases the magnitude of the "power" input signals to angle sensor control 76 and motor field winding control 92.

The position of the direction selector DS off of neutral sets a speed limit for either forward or reverse direction of the vehicle. When the set speed limit is reached, the error signal from speed limit circuit 456, which is additive to the brake signal, equals the power signal from foot pedal 44, and thus the motor field winding current will be zero. The speed limit error may be of such magnitude that the signal to field winding control 92 may actually go negative. The absolute value circuit 444 which responds to either polarity of input signal permits the motor field current to build up toward its maximum value even though the error is negative, and brake sense circuit 442 senses the negative polarity and operates relay BR in relay logic circuit 88 which reverses the angle sensor sine and cosine windings 68 and 70 to brake motor 50.

The speed signal and the speed limit signal are compared in a differential amplifier 500 (see FIG. 23) of the speed limit circuit 456. When the speed limit signal from amplifier 454 exceeds the speed signal, transistor 501 of the differential amplifier 500 is ON and a transistor 502 connected as an emitter follower is OFF so that no output signal is delivered from the speed limit circuit 456 over conductor 504 to the subtractive amplifier 434. Successive pulses from tachometer 80 turn on a transistor 506 and build up a voltage on a capacitor 508 which is a function of the pulse repetition rate and thus of motor speed. The voltage on capacitor 508 is applied to the base of transistor 510 of differential amplifier 500, and when the speed signal and the speed limit signals are equal, the signals cancel due to common mode rejection and no output signal is provided from speed limit circuit 456. When the unidirectional voltage on capacitor 508 exceeds the speed limit signal from amplifier 454, transistor 510 conducts and the voltage drop across resistor 512 in its collector circuit forward biases the base of a transistor 514. Conduction by transistor 514 increases the voltage drop across its collector resistance 516 and the resulting signal is transmitted by emitter follower transistor 502 over conductor 504 to subtractive amplifier 434 where it is additive to the brake signal. At high vehicle speeds maximum output from speed limit circuit 456 occurs if the vehicle speed is approximately 2 miles per hour greater than the set speed limit, and this maximum output from the speed limit circuit 456 is allowed only if the input from the foot power pedal is a maximum. This is accomplished by using the output from brake reference circuit 438 bias the collector of emitter follower transistor 502 and thus establish the clipping level for the speed limit circuit output. Brake reference circuit 438 thus allows the vehicle operator to use either speed limit selector DS or the brake pedal 46 to call for full braking even though the power pedal 44 is fully depressed.

Motor Field Winding Control

Motor field winding control 92 includes an input amplifier 451 (see FIGS. 12 and 18) which receives a low level reference "power" signal from the main summing amplifier 446 of the protection and regulating circuit 78 and provides an output which is amplified successively in a field winding amplifier 458 and a power amplifier 460 for motor field winding 56 and causes the field winding current $I_f$ to increase linearly with foot power pedal along the characteristic shown in FIG. 20 until, at a point corresponding to approximately 70 percent power pedal, means such as a breakover diode (shown only schematically in FIG. 12) changes the gain of power amplifier 460 and results in flattening of the characteristic above this point. This nonlinear characteristic above approximately 70 percent power pedal position results in output power from motor 50 which varies substantially linearly with power pedal position.

Turn Compensation

The mechanically ganged sliders 483 and 484 (see FIG. 22) of a pair of center-tapped rotary turn compensation potentiometers 487 and 488 are operatively connected by suitable gearing (not shown) to the steering wheel of the vehicle so that sliders 483 and 484 are operated together through an angle which is proportional to the angle through which the left and right front wheels 12 and 14 are turned. The center taps of potentiometers 487 and 488 are grounded.

The voltage supply for the potentiometers 487 and 488 is referenced to the foot power pedal output amplifier 432 so that correction for a given degree of turn will be a fixed percentage of the power being developed. The corrective signals are applied to the main summing amplifiers of drives 22, 24, 26 and 28 and are of such polarity that the power applied to the outside wheels on a turn is increased while that applied to the inside wheels is decreased.

A turn reference circuit 490 receives an input from amplifier 432 which is a function of the position of power pedal 44 and provides output voltages of opposite polarity + V and − V on conductors 491 and 492 whose magnitudes are a function of the power signal derived by power pedal potentiometer 430. The voltages + V and − V are connected to the opposite ends of each of the potentiometers 487 and 488, and consequently the polarity of the signals appearing on sliders 483 and 484 is dependent upon the direction in which the vehicle front wheels 12 and 14 are turned and their magnitude is a function of both the degree through which the wheels are turned and the magnitude of the power signal.

Slider 483 is connected to the input of an operational amplifier 494 which, when front wheels 12 and 14 are turned to the left so the signal on slider 483 is positive, provides a positive signal over conductor 495 which is additive to the power signal input to main summing amplifier 446 of the right front wheel electric drive 22, and operational amplifier 494 simultaneously provides a negative output signal over conductor 496 which is subtractive from the power signal input to the main summing amplifier of the left front wheel electric drive 24. The magnitude of such positive and negative signals on conductors 495 and 496 is a function of both the angle through which front wheels 12 and 14 are turned and the power pedal position, thereby providing an input signal which is additive to the power signal input of main summing amplifier 446 on the right wheel which is on the outside of the turn and an input signal which subtracts from the power input signal of the main summing amplifier of left wheel drive 24 which is on the inside of the turn.

Similarly, if front wheels 12 and 14 are turned to the right, the negative signal on slider 483 causes operational amplifier 494 to provide a negative output signal on conductor 495 which is subtractive from the power signal input to the main summing amplifier 446 of the right front wheel drive 22 on the inside of the turn and to also provide a positive output signal on conductor 496 which is additive to the power signal input to the main summing amplifier of the left front wheel drive 24 on the outside of the turn.

Slider 484 of potentiometer 488 is connected to the input of an operational amplifier 497 which is responsive to the polarity and magnitude of the voltage on slider 484 to supply positive and negative signals on conductors 498 and 499 which are additive to and subtractive from the power input signals to the main summing amplifiers of the left and right rear wheel drives 26 and 28 on the outside and inside of the turn respectively.

Current Regulated Starting

Motor stator winding 54 presents a purely resistive load to cycloconverter 58 at the instant of starting the vehicle when it is desired that maximum torque be developed at a motor current not exceeding 125 percent of full load current, and this requires that the displacement angle DT be zero and the motor terminal voltage VT be regulated so that the motor current will not exceed this limit. Further, since motor frequency is zero at start, the output of voltage tachometer 178 is also zero (see the $vt_s'$ characteristics shown in FIG. 12) and consequently another input must be provided to the angle sensor primary windings at start.

When the power pedal 44 is depressed at start, a power reference signal from absolute value circuit 444 proportional to power pedal position is supplied over conductor 462 (see FIG. 18) to a current regulator CR which, in response thereto, provides an output to summing junction 192, and thus to cosine winding amplifiers 194 and 198, and this provides an output signal $VT_s$ from the angle sensor 64 which results in a terminal voltage VT being applied to motor stator winding 54. The output voltage versus speed curves from angle sensor 64 in the speed range from zero to speed F=0.57 resulting from output signals from current regulator CR for 50 percent and 100 percent power pedal positions are shown in FIG. 11 designated CR-50 percent and CR-100 percent.

The "power" reference signal on conductor 462 from absolute value amplifier 444 is coupled through an operational amplifier 468 and the base-emitter circuit of a transistor 470 within current regulator CR to summing junction 192, and the magnitude of the output signal from current regulator CR supplied to cosine winding amplifier 198 is varied as a function of the output from a current control amplifier CCA which receives: (1) a "power" reference signal over conductor 142 from amplifier 451 which is a function of power pedal position as a first input; and, (2) an output signal from voltage tachometer 178 which is a function of motor speed as a second input. Current control amplifier CCA subtracts from the foot pedal reference "power" signal the amplified signal $vt_s'$ from voltage tachometer 178 which varies with frequency as shown in FIGS. 11 and 12. Consequently the output voltage speed characteristic VR shown in FIG. 19 for current control amplifier CCA has a negative slope and varies in magnitude as a function of power pedal position.

Since the output $vt_s'$ from voltage tachometer 178 is zero at zero speed, the output VR from current control amplifier CCA will be high at start, and consequently the voltage on the collector of transistor 470 and the output signal from current regulator CR will be high at start. If power pedal 44 is fully depressed at start, the output signal over conductor 142 from clipping level network 451 is 100 percent, and since this is the only input to current control amplifier CCA, approximately 2.0 volts will be applied to the collector of transistor 470 and 100 percent output signal will be supplied from current regulator CR to cosine winding amplifier 198, thereby energizing the motor stator winding 54 at start with the voltage shown at 0.8 relative volts in FIG. 11.

Motor 50 will now accelerate, its frequency will increase, the output $vt_s'$ from voltage tachometer 178 (which is an input to current control amplifier CCA) will increase linearly with frequency (as shown in FIG. 11) and subtract from the "-power" reference signal, and the output signal VR from current control amplifier CCA will correspondingly decrease as shown in FIG. 19 and lower the collector voltage on transistor 470 and the output signal from current regulator CR.

The "power" reference signal on conductor 462 proportional to power pedal position is applied to the inverting input of operational amplifier 468. As the power pedal 44 is depressed further, the forward bias on the base of transistor 470 is varied to increase the output from current regulator CR and thereby increase the output signal from cosine winding amplifier 198.

The noninverting input of operational amplifier 468 receives an input signal from current transformers 90 which is a function of the current from generator 30 in power busses 38, and such input signal is in a direction to reverse bias the base of transistor 470 and to decrease the output signal from current regulator CR. The power reference signal at the inverting input to operational amplifier 468 and the signal proportional to motor current at the noninverting input tend to balance, so the output signal from current regulator CR to cosine winding amplifier 198 reaches a voltage which produces a motor terminal voltage VT and motor armature current $I_a$ corresponding to the position of power pedal 44.

The signal $vt_s'$ from voltage tachometer 178 is subtracted in current control amplifier CCA from the power reference signal, and this changes the collector voltage on transistor 470 and sets the current regulator output at a value which can only result in a desired motor terminal voltage VT. If the output signal from current regulator CR and the output signal $vt_s'$ from voltage tachometer 178, (which are added at summing junction 192), result in a motor terminal voltage VT and consequent current $I_a$ that exceeds the desired current setting, the feedback current signal from current transformers 90 to operational amplifier 468 will reduce the current regulator output and thus decrease the motor terminal voltage VT.

Since the voltage speed characteristic VR (see FIG. 19) of current control amplifier CCA has a negative slope, the contribution of current regulator CR to motor voltage VT will be less and less as the motor 50 accelerates until at speed F=0.57, the output of current regulator CR will be zero. Thus up to speed 0.57, the current regulator output will add to or subtract from the input to cosine winding amplifier 198 so the motor current $I_a$ is regulated to a prescribed value (corresponding to the dotted line characteristics designated CR in FIG. 11). Beyond speed F=0.57 the motor current $I_a$ is dependent upon motor field current $I_f$, the magnitude of angle sensor output signal $VT_s$ and the displacement angle $DT_s$.

Relay Logic

In order to initiate energization of electric drive system 10, the operator closes a toggle switch SW (see FIG. 18) on the vehicle console to connect the coil of relay VR across the conductors + and − of the power source.

Relay VR operates:
Closes contacts VR1 to energize generator field winding 34; and
Closes contacts VR2 to prepare a circuit to master control relay CR.

If the operator moves the travel direction and speed limit selector DS in the forward direction to close limit switch contacts DSF1 (or in the reverse direction to close limit switch contacts DSR1) and also depresses power pedal 44 which operates a limit switch 44–1, a circuit is completed connecting the coil of master control relay CR across the power source conductors.

Master control relay CR operates:
Closes contacts CR1 to complete a seal-in circuit in series with contacts ZSP of an interlock which is open at zero speed and closed when the vehicle is moving;
Closes contacts CR2 to complete an energizing circuit over conductor 480 to the coil of relay SINF;
Closes contacts CR3 to complete an energizing circuit to the coil of cosine winding forward relay COSF in series with travel direction selector limit switch contacts DSF3; and Closes contacts CR4 and CR5 to prepare circuits to relays SINR and COSR.

Relay SINF operates:
Closes its contacts SINF1 and SINF2 to connect the sine winding 68 to the sine amplifier 174 in the forward direction; and
Closes contacts SINF3 to complete an energizing circuit to the coil of sine tachometer relay SINT in series with the travel direction selector contacts DSF2.

Relay COSF operates:
Closes its contacts COSF1 and COSF2 to connect the angle sensor cosine winding 70 to cosine amplifier 198 in the forward direction; and
Closes its contacts COSF3 to complete a seal-in circuit.

Relay SINT operates:
Closes its SINT1 contacts to connect the main summing amplifier 446 to sine tachometer 138 and voltage tachometer 178.

Angle sensor sine winding 68 must be reversed during braking and such reversal is to occur at zero sine voltage, and relay SINT controls the buildup of voltage on the sine amplifier 174.

With both SINF and COSF relays operated, the angle sensor sine and cosine windings 68 and 70 are connected in the forward direction and the vehicle will move forward. If the travel direction selector DS was in the reverse direction at starting when power pedal 44 was depressed, the circuit is not completed to relay COSF at limit switch contacts DSF3. Rather relay CR, in operating, closes its contacts CR5 to complete an energizing circuit to relay COSR in series with travel direction selector contacts DSR3. Relay COSR then operates to reverse the connection of angle sensor cosine winding 70 to cosine winding amplifier 198 so motor 50 runs in reverse.

Braking of the vehicle can be initiated by the operator depressing brake pedal 46 or moving the travel direction and speed limit selector DS in the direction opposite to vehicle travel, and braking is also initiated when the vehicle speed exceeds the speed limit set by selector DS. As explained hereinbefore, speed limit circuit 456 receives a speed limit signal which is a function of the setting of selector DS and supplies an error signal to subtraction amplifier 434 which reduces the amplifier output (and thus the motor field current $I_f$) to zero when the "speed limit" error signal equals the "power" signal from power pedal 44. When the "speed limit" error signal input is greater than the "power" signal input, the polarity of the output signal from subtraction amplifier 434 reverses and actuates brake sense circuit 442 which operates master braking relay BR. Movement of selector DS to a direction opposite to vehicle travel also results a situation similar to speed limit which reverses the polarity of the output signal from subtraction amplifier 434 and actuates the brake sense circuit 442 to operate master brake relay BR.

Depressing brake pedal 46 supplies a braking signal from potentiometer 436 to subtraction amplifier 434 whose magnitude is proportional to brake pedal position, and which wipes out the "power" signal input and reduces the subtraction amplifier output (and thus motor field current $I_f$) to zero and then builds it up toward maximum again. The brake reference input to brake pedal potentiometer 436 is from power pedal amplifier 432. If power pedal 44 is not depressed, the brake signal will vary from zero (when brake pedal 46 is not depressed) to 100 percent corresponding to full motor field winding current $I_f$ at 100 percent brake pedal position. If power pedal 44 is fully depressed, and brake pedal 46 is also depressed, the "power" signal input to subtraction amplifier 434 is wiped out at 50 percent brake pedal position, and at 100 percent brake pedal position 100 percent motor field current $I_f$ will again be supplied.

The angle sensor sine winding 68 is connected in the forward direction by relay SINF whenever the vehicle is running normally forward or reverse, and it is only during braking that sine winding 68 is reversed. Switching of the sine winding 68 is accomplished only at zero voltage on sine amplifier 174 when a relay ZSIN (not shown), which is energized from the output of sine amplifier 174, releases to open its contacts ZSIN1 and thus open the circuit to relay SINF.

Operation of brake sense circuit 442 completes an energizing circuit to master braking relay BR.

Relay BR operates:
Opens contacts BR1 to prepare release of relay SINF when the output of sine amplifier 174 is zero and interlock ZSIN opens;
Opens contacts BR2 to release relay SINT, which releases to deenergize sine amplifier 174; and
Closes contacts BR3, BR4 and BR5 to operate relays SINR, COSRX and BRY.

Relay SINR operates:
Closes its contacts SINR1 and SINR2 to reverse the connection of angle sensor sine winding 68 to sine amplifier 174.

Relay COSRX operates:
Opens contacts COSRX1 to open a seal-in circuit for relay COSF; and
Closes contacts COSRX2 to prepare a circuit to energize relay COSR when relay COSF releases.

Relay COSR operates:
Reverses the connection of angle sensor cosine amplifier 198.

Relay BRY operates:
Opens contacts BRY1 (shown also in FIG. 12) to reduce the level at which the $VT_s$ signals are clipped in clipping circuit 84 to approximately 0.2 of maximum peak and thus limit to terminal voltage VT to motor stator winding 54; and
Closes contacts BRY2 (shown also in FIG. 12) to reduce the gain of field winding amplifier 458 and limit the field current $I_f$ to motor winding to a value which (together with the reduction in VT) will not result in regenerative power being fed back from motor 54 to diesel engine 20 beyond the absorption capability of the engine.

Reversal of sine winding 68 and cosine winding 70 results in regenerative braking of motor 50. Reducing the clipping level by opening contacts BRY1 decreases the magnitude of the input signal $VT_s$ to cycloconverter 58 and thus reduces the terminal voltage VT on motor stator winding 54 and limits the amount of regenerative power that may be fed back from motor 50 through cycloconverter 58 to diesel engine 20 under braking conditions to approximately 50 percent.

While only a single embodiment of the invention has been illustrated and described, many modifications and variations thereof will be readily apparent to those skilled in the art, and consequently it is intended in the appended claims to cover all such modifications and variations which are within the true spirit and scope of the invention.

The embodiments of the invention in which an exclusive property or privilege is claimed are defined as follows:

We claim:

1. In combination, a land vehicle having a ground-engaging tractive element,
   at least one inductor type synchronous motor on said vehicle having a polyphase stator winding, a rotor operatively connected to said tractive element, and means for generating magnetic poles in said rotor,
   a prime mover on said vehicle,
   a polyphase alternator on said vehicle driven by said prime mover,
   means operatively connected to said rotor for generating an output signal having a frequency which is a function of the speed of said motor,
   a polyphase frequency converter between said alternator and said stator winding controlled by said output signal, and
   control means for selectively varying a condition of said output signal.

2. In the combination of claim 1 wherein said rotor is solid and ferromagnetic and said means for generating magnetic poles in said rotor includes a field winding on the stator of said motor.

3. In the combination of claim 2 wherein said output signal generating means derives a polyphase output signal, and said frequency converter is a cycloconverter having controlled rectifiers between each phase of said stator winding and said alternator.

4. In the combination of claim 3 wherein said control means includes means for deriving reference signals which are functions of the phase voltages generated by said alternator, means for combining said reference signals and the phase output signals to provide composite sequence signals, and means controlled by said sequence signals for deriving gating signals for said controlled rectifiers.

5. In the combination of claim 4 wherein said gating signal deriving means includes means for detecting when said sequence signals cross the zero axis and wherein the maximum frequency of said output signal over the speed range of said motor is F cycles per second, and including governor means for controlling the speed of said prime mover so that said alternator generates a polyphase voltage having a frequency of at least 2F cycles per second.

6. In the combination of claim 5 and including means for selectively deriving a power signal which is a function of the desired tractive effort of said vehicle and wherein said control means is responsive to said power signal and varies a condition of said polyphase output signal as a function of said power signal.

7. In the combination of claim 6 and including tachometer means for deriving a speed signal which is a function of the speed of said motor and wherein said control means regulates the magnitude and shifts the phase of said output signal in accordance with said power signal and said speed signal.

8. In the combination of claim 7 and including manually operated means for selectively driving a brake signal, and wherein said control means includes a subtractive amplifier for comparing said power and brake signals and generating a difference signal which is a function of their difference, and wherein said control means regulates the magnitude and shifts the phase of said polyphase output signal in accordance with said difference signal and said speed signal and regulates the energization of said field winding in accordance with said difference signal.

9. In the combination of claim 8 wherein said subtractive amplifier provides a difference signal of one polarity when said brake signal is greater than said power signal and of the opposite polarity when said power signal is greater than said brake signal and wherein said control means includes absolute value amplifier means responsive to either polarity of said difference signal for providing an absolute value signal whose magnitude is a function of the magnitude of said difference signal, and wherein said control means regulates the magnitude and shifts the phase of said polyphase output signal as a function of said absolute value signal and said speed signal and also controls the energization of said field winding as a function of said absolute value signal.

10. In the combination of claim 9 wherein said control means includes brake sense means responsive to said one polarity of said difference signal for shifting the phase of said polyphase output signal 180° to effect regenerative braking of said motor.

11. In the combination of claim 10 wherein said control means includes vector adder inductor means having a pair of energizing windings and a secondary winding inductively linked to said energizing windings and in which said output signal is induced and said brake sense means includes means for reversing both of said energizing windings to shift the phase of said output signal 180°.

12. In the combination of claim 9 and including manually operated travel direction selector means for shifting the phase of said polyphase output signal to effect reversal of the direction of rotation of said motor and the direction of travel of said vehicle.

13. In the combination of claim 12 wherein said control means includes vector adder inductor means having a pair of energizing windings and a secondary winding inductively linked to said energizing windings and in which said output signal is induced and said travel direction selector means includes means to reverse one of said energizing windings to shift the phase of said output signal.

14. In the combination of claim 9 and including protective means responsive to an undesirable operating condition in said vehicle for deriving a fault signal, and wherein said control means includes summing amplifier means receiving said absolute value signal and said fault signal as inputs and providing a summing signal which is a function of their sum, and wherein said control means regulates the magnitude and shifts the phase of said polyphase output signal as a function of said summing signal and said speed signal and controls the energization of said field winding as a function of said summing signal.

15. In the combination of claim 8 and including means for selectively deriving a speed limit signal which is a function of the desired maximum speed of said vehicle, speed limit means for comparing said speed signal and said speed limit signal and for deriving a speed limit error signal when the former exceeds the latter, said speed limit error signal being an input to said subtractive amplifier and being additive to said brake signal input.

16. In the combination defined by claim 2 and including means for selectively deriving a power signal which is a function of the desired tractive effort of said vehicle and wherein said control means is responsive to said power signal.

17. In the combination of claim 16 and including tachometer means for deriving a speed signal which is a function of the speed of said motor and wherein said control means regulates the magnitude and shifts the phase of said output signal in accordance with said power signal and said speed signal.

18. In the combination of claim 16 and including manually controlled means for selectively deriving a brake signal, and wherein said control means includes a subtractive amplifier for comparing said power and said brake signals and for generating a difference signal which is a function of their difference, and wherein said control means varies a condition of said output signal and regulates the energization of said field winding as a function of said difference signal.

19. In the combination of claim 18 wherein said subtractive amplifier provides a difference signal of one polarity when said brake signal is greater than said power signal and of the opposite polarity when said power signal is greater than said brake signal and wherein said control means includes absolute value amplifier means responsive to either polarity of said difference signal for providing an absolute value signal whose magnitude is a function of the magnitude of said difference signal, said control means varying a condition of said output signal as a function of said absolute value signal and also regulating the voltage applied to said field winding as a function of said absolute value signal.

20. In the combination of claim 19 wherein said control means includes brake sense means responsive to said one polarity of said difference signal for regeneratively braking said synchronous motor.

21. In the combination of claim 18 wherein said control means includes brake sense means responsive to said one polarity of said difference signal for shifting the phase of said output signal 180° to effect regenerative braking of said motor.

22. In the combination of claim 21 wherein said control means includes vector adder inductor means having a pair of energizing windings and a secondary winding inductively linked to said energizing windings and in which said output signal is induced and said brake sense means includes means for reversing both of said energizing windings to shift the phase of said output signal 180°.

23. In the combination of claim 3 and including manually operable travel direction selector means for shifting the phase of the voltage supplied by said cycloconverter to said stator winding to reverse the direction of rotation of said motor and thereby reverse the direction of travel of said vehicle.

24. In the combination of claim 23 wherein said control means includes vector adder inductor means having a pair of energizing windings and a secondary winding inductively linked to said energizing windings and in which said output signal is induced and said travel direction selector means includes means for reversing one of said energizing windings to shift the phase of said output signal.

25. In the combination of claim 19 and including protective means responsive to an undesirable operating condition in said vehicle for deriving a fault signal and wherein said control means includes a summing amplifier means receiving said absolute value and fault signals as inputs and providing a summing signal which is a function of their sum and said control means varies a condition of said output signal and controls the energization of said field winding as a function of said summing signal.

26. In the combination of claim 18 and including manually operated means for deriving a speed limit signal whose magnitude is proportional to the desired maximum speed of said vehicle,
tachometer means for generating a speed signal which is a function of the speed of said motor,
speed limit means for comparing said speed signal and said speed limit signal and for deriving a speed limit error signal when the former exceeds the latter, said speed limit error signal being an input to said subtractive amplifier and being additive with said brake signal input.

27. In combination, a land vehicle having an earth-engaging tractive element,
at least one synchronous electric motor on said vehicle having a stator winding and a rotor operatively connected to said tractive element,
a prime mover on said vehicle,
electric generator means including an alternator on said vehicle driven by said prime mover,
means on said vehicle for selectively deriving a power signal which is a function of the desired tractive effort of said vehicle,
manually controlled means for selectively deriving a brake signal,
subtractive amplifier means for comparing said power and brake signals and for generating a difference signal which is a function of their difference, and
control means between said electric generator means and said stator winding for regulating the voltage delivered by said generator means to said stator winding as a function of said difference signal.

28. In the combination of claim 27 wherein said subtractive amplifier means generates a difference signal of one polarity when said brake signal is greater than said power signal and of the opposite polarity when said power signal is greater than said brake signal, and wherein said control means includes absolute value amplifier means responsive to either polarity of said difference signal for providing an absolute value signal whose magnitude is a function of the magnitude of said difference signal, said control means regulating the voltage delivered by said generator means to said stator winding as a function of said absolute value signal.

29. In the combination of claim 27 wherein said means for deriving a brake signal is responsive to the magnitude of said power signal and, when it is at a predetermined partially operated position, derives a magnitude of brake signal greater than the magnitude of said power signal when said power signal deriving means is fully operated.

30. In the combination of claim 29 wherein said means for deriving a power signal includes a potentiometer, a direct current power source connected across the winding of said potentiometer, and a power signal amplifier coupled to the movable contact of said potentiometer and said means for deriving a brake signal includes a potentiometer having one end coupled to the output of said power signal amplifier.

31. In the combination of claim 28 wherein said control means includes brake sense means responsive to said one polarity of said difference signal for regeneratively braking said electric motor.

32. In the combination of claim 31 and including a cycloconverter between said generator means and said stator winding of said motor regulated by said control means and said brake sense means is responsive to said one polarity of said difference signal to shift the phase of the voltage supplied by said cycloconverter to said stator winding 180° to effect regenerative braking of said motor.

33. In the combination of claim 32 wherein said control means includes vector adder inductor means having a pair of energizing windings and a secondary winding inductively linked to said energizing windings for deriving a control signal for said cycloconverter and said brake sense means includes means for reversing both of said energizing windings to shift the phase of the voltage supplied by said cycloconverter 180°.

34. In the combination of claim 32 and including manually operable travel direction selector means for shifting the phase of the voltage supplied by said cycloconverter to said stator winding to reverse the direction of rotation of said motor and thereby reverse the direction of travel of said vehicle.

35. In the combination of claim 34 wherein said control means includes vector adder inductor means having a pair of energizing windings and a secondary winding inductively linked to said energizing windings and in which said output signal is induced and said travel direction selector means includes means for reversing one of said energizing windings to shift the phase of said voltage supplied by said cycloconverter to said stator winding.

36. In the combination of claim 27 and including manually operable speed limit means for selectively deriving a speed limit signal, and wherein said control means includes tachometer means for deriving a speed signal which is a function of the speed of said motor and means for comparing said speed limit signal and said speed signal and for deriving a speed limit error signal when the latter exceeds the former, said speed limit error signal being an input to said subtractive amplifier means and being additive to said brake signal input.

37. In the combination of claim 36 and including a cycloconverter between said generator means and said stator winding of said motor regulated by said control means and travel direction selector means for shifting the phase of the voltage supplied by said cycloconverter to said stator winding to reverse the direction of rotation of said motor and thereby reverse the direction of travel of said vehicle and wherein said vehicle has a manually operable travel direction selector and speed limiting movable element, the direction of movement of said element controlling said travel direction selector means and the degree of movement thereof controlling said speed limit signal deriving means and the magnitude of said speed limit signal.

38. In the combination of claim 27 wherein said control means includes means responsive to an undesirable operating condition in said vehicle for reducing the voltage delivered by said generator means to said stator winding below that voltage level which is a function of said power signal.

39. In the combination of claim 28 wherein said control means includes a summing amplifier receiving said absolute value signal as an input and means responsive to an undesirable operating condition in said vehicle for deriving a fault signal which is an input to said summing amplifier, and wherein said summing amplifier provides a summing signal which is a function of the sum of said absolute value and fault signals and said control means regulates the power delivered by said generator means to said stator winding as a function of said summing signal.

40. In the combination of claim 39 wherein said means responsive to an undesirable operating condition comprises means for detecting a predetermined magnitude of overcurrent delivered by said generator means to said stator winding.

41. In the combination of claim 39 wherein said means responsive to an undesirable operating condition comprises means for detecting a predetermined overtemperature of said motor.

42. In combination, a land vehicle having a plurality of ground-engaging tractive elements, a plurality of inductor type synchronous motors on said vehicle each having a polyphase stator winding, a solid ferromagnetic rotor operatively connected to one of said tractive elements, and a field winding on said motor stator for generating magnetic poles in said rotor, a prime mover on said vehicle, polyphase electric generator means on said vehicle driven by said prime mover, a plurality of means each of which is associated with one of said motors operatively connected to said rotor for deriving an output signal having a frequency which is a function of the speed of said one motor, a plurality of polyphase frequency converters each of which is connected between said electric generator means and the stator winding of one of said motors controlled by said output signal which is a function of the speed of said one motor, a plurality of control means each of which is associated with one of said motors for varying a condition of said output signal, and manually operated means for selectively deriving a power signal which is a function of the desired tractive effort of said vehicle, each of said control means being responsive to said power signal.

43. In the combination defined by claim 42 wherein said electric generator means includes a polyphase alternator on said vehicle connected to said motors for each pair of tractive elements, said alternator being driven by said prime mover.

44. In the combination of claim 42 including tachometer means associated with each of said motors for generating a speed signal which is a function of the speed of said motor, and wherein each of said control means regulates the voltage and shifts the phase of said output signal as a function of said speed signal and said power signal.

45. In the combination of claim 42 and including manually controlled means for selectively deriving a brake signal, and wherein each of said control means includes a subtractive amplifier for comparing said power and brake signals and generating a difference signal which is a function of their difference, each control means varying a condition of said polyphase output signal and controlling the energization of said field winding as a function of said difference signal.

46. In the combination of claim 45 wherein said subtractive amplifier provides a difference signal of one polarity when said brake signal is greater than said power signal and of the opposite polarity when said power signal is greater than said brake signal and each said control means also includes absolute value amplifier means responsive to either polarity of said difference signal for providing an absolute value signal whose magnitude is a function of the magnitude of said difference signal, each said control means regulating a condition of said output signal and controlling the energization of said field winding as a function of said absolute value signal.

47. In the combination of claim 46 and including a plurality of tachometer means each of which is associated with one of said motors for deriving a speed signal which is a function of the speed of said motor and wherein each said control means regulates the magnitude and phase of said polyphase output signal as functions of said absolute value signal and said speed signal.

48. In the combination of claim 46 and including a plurality of cycloconverters each of which is between said generator means and the stator winding of one of said motors and is controlled by said output signal and wherein each said control means includes brake sense means responsive to said one polarity of said difference signal for shifting the phase of said output signal 180° to effect regenerative braking of said motor.

49. In the combination of claim 48 wherein each of said control means includes vector adder inductor means having a pair of energizing windings and a secondary winding inductively linked to said energizing windings in which said output signal is induced and said brake sense means includes means for reversing both of said energizing windings.

50. In the combination of claim 45 wherein said vehicle has manually operated travel direction selector means for shifting the phase of all of said output signals to effect reversal of the direction of rotation of said plurality of motors and thus reverse the direction of travel of said vehicle.

51. In the combination of claim 50 wherein each of said control means includes vector adder inductor means having a pair of energizing windings and a secondary winding inductively linked to said energizing windings in which said output signal is induced and said travel direction selector means includes means in each of said control means for reversing one of said energizing windings to shift the phase of said output signal.

52. In the combination of claim 45 and including manually operable means for selectively deriving a speed limit signal which is a function of the desired maximum speed of said vehicle and wherein each of said control means includes means for deriving a speed signal which is a function of the speed of the associated motor and also includes speed limit means for comparing said speed signal and said speed limit signal and for deriving a speed limit error signal when the former exceeds the latter, said speed limit error signal being an input to said subtractive amplifier and being additive to said brake signal.

53. In the combination of claim 48 wherein said vehicle has a plurality of protective means each of which is associated with one of said motors and is responsive to an undesirable operating condition thereof for generating a fault signal, and each of said control means includes a summing amplifier receiving the corresponding fault signal and absolute value signal as inputs and providing a summing signal which is a function of their sum, and wherein each said control means also includes tachometer means for generating a speed signal which is a function of the speed of said motor and said control means regulates the phase and magnitude of said polyphase output signal as a function of said speed and summing signals and also includes means for applying a voltage to said field winding which is a function of said summing signal.

54. In the combination of claim 52 wherein said manually operable means for deriving a speed limit signal also actuates travel direction selector means for shifting the phase of all of said polyphase output signals to effect reversal of the direction of rotation of said plurality of motors.

55. In the combination of claim 54 wherein each said control means includes vector adder inductor means having a pair of energizing windings and a secondary winding inductively linked to said energizing windings in which said output signal is induced and said travel direction selector means includes means for reversing one of said energizing windings in each said control means.

56. In the combination of claim 53 wherein each frequency converter is a cycloconverter having controlled rectifiers between each phase of said generator means and said stator winding and each said control means includes means for deriving reference signals which are functions of the phase voltages produced by said generator means, means for combining said reference voltages and the associated phase output signals to derive composite sequence signals, and means controlled by said sequence signals for deriving gating signals for said controlled rectifiers.

57. In the combination of claim 56 wherein said gating signal deriving means includes means for detecting when said gating signals cross the zero axis, and wherein the maximum frequency of said output signals over the speed range of said motors is $f$ cycles per second, and including governor means for controlling the speed of said prime mover so that said generator means produces a polyphase voltage having a frequency of at least $2f$ cycles per second.

58. In the combination of claim 37 wherein said subtractive amplifier means generates a difference signal of one polarity when said brake signal is greater than said power signal and of the opposite polarity when said power signal is greater than said brake signal and wherein said control means includes brake sense means responsive to said one polarity of said difference signal for regeneratively braking said synchronous electric motor.